US009208382B2

(12) United States Patent
Soubra

(10) Patent No.: US 9,208,382 B2
(45) Date of Patent: Dec. 8, 2015

(54) METHODS AND SYSTEMS FOR ASSOCIATING A KEYPHRASE WITH AN IMAGE

(71) Applicant: Trimble Navigation Limited, Sunnyvale, CA (US)

(72) Inventor: Omar Soubra, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 336 days.

(21) Appl. No.: 13/790,096

(22) Filed: Mar. 8, 2013

(65) Prior Publication Data

US 2014/0254865 A1 Sep. 11, 2014

(51) Int. Cl.
*G06K 9/00* (2006.01)
*G06K 9/62* (2006.01)

(52) U.S. Cl.
CPC ........ *G06K 9/00624* (2013.01); *G06K 9/00214* (2013.01); *G06K 9/6253* (2013.01)

(58) Field of Classification Search
None
See application file for complete search history.

(56) References Cited

U.S. PATENT DOCUMENTS

| 5,189,606 | A | 2/1993 | Burns et al. | |
|---|---|---|---|---|
| 7,856,125 | B2 * | 12/2010 | Medioni et al. | 382/118 |
| 7,890,509 | B1 | 2/2011 | Pearcy et al. | |
| 7,991,575 | B2 | 8/2011 | Vogel et al. | |
| 8,171,016 | B2 * | 5/2012 | Van de Sluis et al. | 707/715 |
| 8,285,512 | B2 | 10/2012 | Vogel et al. | |
| 8,826,282 | B2 | 9/2014 | Motoyama et al. | |
| 2007/0162324 | A1 | 7/2007 | Suzuki et al. | |
| 2011/0064312 | A1 | 3/2011 | Janky et al. | |
| 2012/0163656 | A1 | 6/2012 | Wang et al. | |
| 2012/0166137 | A1 | 6/2012 | Grasser et al. | |
| 2012/0213490 | A1 * | 8/2012 | Steiner | 386/241 |
| 2014/0257906 | A1 | 9/2014 | Soubra | |

OTHER PUBLICATIONS

Frome et al. (2004) University of California Berkeley, "Recognizing Objects in Range Data Using Regional Point Descriptors" 14 pages.
U.S. Appl. No. 13/790,114, filed Mar. 8, 2013 by Soubra and entitled "Workflow Management Method and System," 70 pages.
U.S. Appl. No. 13/790,114; Notice of Publication mailed Sep. 11, 2014; 1 page.
U.S. Appl. No. 13/790,114; NonFinal Office Action dated Jun. 5, 2015; 43 pages.

* cited by examiner

*Primary Examiner* — Shefali Goradia
(74) *Attorney, Agent, or Firm* — Swanson & Bratschun, L.L.C.

(57) ABSTRACT

Novel tools and techniques are described for identifying objects and/or persons. In one aspect, a method might comprise obtaining a digital image of an object(s) with a digital image recording device. The digital image may be transmitted to a remote computer system, and compared to multiple preexisting digital images using an image comparison software application running thereon. A set of preexisting digital images matching the digital image of the object(s) may be identified, and a (best match) keyphrase associated with the preexisting digital images may be determined. The keyphrase may be returned to a user computer for user confirmation or rejection. In some embodiments, a point cloud may be generated for each object in the image, and fitted with available 3D models, so as to confirm the keyphrase. In some embodiments, the confirmed keyphrase may be sent to a user computer for implementation in a cadastral survey application.

31 Claims, 14 Drawing Sheets

METHODS AND SYSTEMS FOR ASSOCIATING A KEYPHRASE WITH AN IMAGE

CROSS-REFERENCES TO RELATED APPLICATIONS

The present disclosure may be related to the following commonly assigned application(s)/patent(s):

U.S. patent application Ser. No. 13/790,114 filed on a date even herewith by Soubra et al. and titled "Workflow Management Method and System", which is incorporated by reference herein in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods and systems for identification of objects and people in images, and more particularly, to methods and systems for identification of objects and people in the course of cadastral surveys.

BACKGROUND

A cadastre or cadastral survey is a public record, survey, or map of the value, extent, and ownership of land as a basis of taxation. Traditionally, cadastral surveys have been conducted by cadastral surveyors physically entering a particular region of land and conducting surveys of landmarks (both natural and manmade) by hand. The surveyors identify objects based on the personal knowledge of the surveyor or members of the surveying team, in order to establish the cadastre for each plot of land. This method, however, is time consuming and inefficient.

As a result of the problems mentioned above, certain regions such as newly developed lands or recently developed lands are left without proper surveyed lands, giving rise to uncertainty as to value, extent, and ownership.

The embodiments disclosed herein are directed toward overcoming one or more of the problems discussed above.

BRIEF SUMMARY

Various embodiments provide tools and techniques to enable identification of objects and persons in images for the purpose of establishing a cadastre for each plot of land in a region.

According to some embodiments, a method might comprise obtaining a digital image of one or more objects, structures, landmarks, or persons using a digital image recording device. The digital image may be transmitted to a remote computer system. An image comparison software application running on the remote computer system might be used to compare the digital image to multiple preexisting digital images. A set of preexisting digital images matching the digital image of the one or more objects may be identified, and a keyphrase or best match keyphrase associated with the preexisting digital images may be determined. The (best match) keyphrase may be returned to a user computer for user confirmation or rejection. In some embodiments, a point cloud may be generated for each object in the image, and fitted with available 3D models. As a result, the keyphrase may be confirmed, while automatically modeling the scene. In some embodiments, the confirmed keyphrase may be sent to a user computer for implementation in a secondary software application including, without limitation, a land survey application, an architectural survey application, a geographic information system ("GIS") application, a cadastral survey application, an object recognition software application, a person identification application, and the like.

The tools provided by various embodiments include, without limitation, methods, systems, and/or software products. Merely by way of example, a method might comprise one or more procedures, any or all of which might be executed by a computer system. Correspondingly, an embodiment might provide a computer system configured with instructions to perform one or more procedures in accordance with methods provided by various other embodiments. Similarly, a computer program might comprise a set of instructions that are executable by a computer system, or by a processor located in the computer system, to perform such operations. In many cases, such software programs are encoded on physical, tangible, and/or non-transitory computer readable media. Such computer readable media might include, to name but a few examples, optical media, magnetic media, and the like.

In one aspect, a method of associating a keyphrase with an image might comprise obtaining a first digital image of an object with a digital image recording device. The method might also comprise storing the first digital image as an image file accessible with a local computer system, and transmitting the image file to a remote image comparison software application running on a remote computer system. The method may further comprise comparing the first digital image to multiple preexisting digital images with the image comparison software application. The method may additionally comprise identifying a set of preexisting digital images matching the first digital image, and determining a keyphrase associated with the preexisting digital images. In some embodiments, the method may further comprise returning the keyphrase to the local computer system.

According to some embodiments, the method may further comprise obtaining a second digital image of one or more objects with the digital image recording device. The method may also comprise isolating the one or more objects in the second digital image with the remote image comparison software application, and dividing the second digital image into one or more portions corresponding to the one or more objects with the remote image comparison software application. The method may further comprise comparing each of the one or more portions of the second digital image to multiple preexisting digital images with the remote image comparison software application. The method may also identify one or more sets of preexisting digital images matching corresponding one or more portions of the second digital image, and determine one or more keyphrases associated with the preexisting digital images corresponding to each of the one or more objects. In some embodiments, the method may further comprise returning the one or more keyphrases corresponding to each of the one or more objects to the local computer system.

In some embodiments, the method may further comprise generating a point cloud for each of the one or more objects in the digital image. The method may then fit each point cloud with available 3D models, and determine an identity for each of the one or more objects based on the fit of each point cloud with the available 3D models.

The method, according to some embodiments, may further comprise obtaining user input confirming or rejecting the keyphrase returned to the local computer system. The method may also associate a confirmed keyphrase with the digital image, while retransmitting the image file to the remote image comparison software application for reprocessing of the digital image if the keyphrase is rejected. In some embodiments, the confirmed keyphrase is a keyphrase associated with one or more of a surveyed feature or a location in a cadastral survey.

In another aspect, a system might comprise a digital imaging device, a local computer system, and a remote computer system. The local computer system might be in digital communication with the digital imaging device, and might comprise a local processor and a local computer readable storage medium. The local computer readable storage medium might have encoded thereon instructions providing for the storage of an image file of a digital image of an object obtained by the digital imaging device. The remote computer system might be in digital communication with the local computer system over a network, and might comprise a remote processor and a remote computer readable storage medium. The remote computer readable storage medium might have instructions encoded thereon providing for receiving the digital image from the local computer system. The instructions may include instructions for comparing the digital image to multiple preexisting digital images, and identifying a set of preexisting digital images matching the digital image. The instructions may further include instructions for determining a keyphrase associated with the preexisting digital images and returning the keyphrase to the local computer system.

In some embodiments, the instructions may include instructions for generating a point cloud for the object in the digital image, and fitting the point cloud with available 3D models. The instructions may further include instructions for determining an identity for the object, based on the fit of the point cloud with the available 3D models. The instructions, according to some embodiments, might include instructions for comparing the identity with the keyphrase, returning one of the identity and the keyphrase, based on a determination that the identity and the keyphrase match. In some embodiments, the instructions may include instructions for repeating at least one of determining the keyphrase or determining an identity for the object, based on a determination that the identity and the keyphrase do not match.

According to some embodiments, the local computer readable storage has instructions encoded thereon further providing for transferring the keyphrase returned to the local computer system to a secondary software application. The secondary software application may be software application selected from a group consisting of a land survey program, an architectural survey program, a geographical information system program, a cadastral survey program, an object recognition program, and a person identification program. In some embodiments, the secondary software application may comprise a database of human identifications.

The digital imaging device, in some embodiments, might comprise one or more of a digital camera, a video recorder, a webcam, a personal communications device having camera functionality, a surveying instrument, or a tablet computer. In some embodiments, the keyphrase might consist of a single word or might consist of a phrase containing two or more words.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
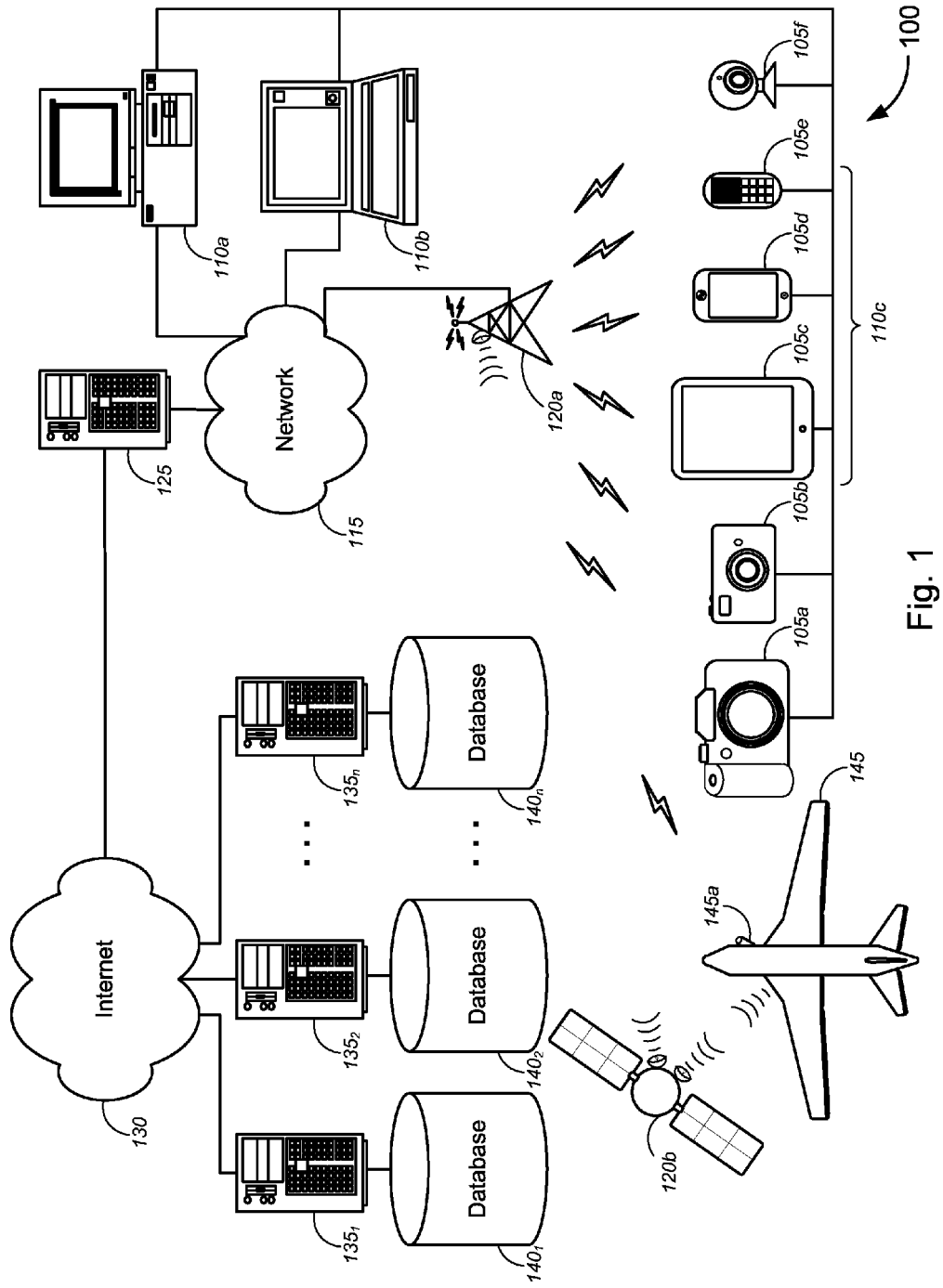
FIG. 1 is a generalized system diagram illustrating an aspect of a system for performing image identification, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Herein, the terms "cadastre" and "cadaster" are interchangeable, and refer to a public record, survey, or map of the value, extent, and ownership of a particular plot of land as a basis of taxation. The term "cadastral survey" refers to a survey conducted to establish a cadastre for a plot of land. The terms "image identification" or "image recognition" refer to identification or recognition of one or more objects, landmarks, structures, or persons in a captured image. Further, a local computer system, as described below, may comprise one or more local computers, thus the terms "local computer system," "local computer," and "local computers" are interchangeable. Likewise, a remote computer system, as described below, may comprise one or more remote computers. Therefore, the terms "remote computer system," "remote computer," and "remote computers" are interchangeable.

A set of embodiments provides novel methods and systems for identification or recognition of one or more objects or persons in one or more images for the purposes of establishing a cadastre for a plot of land amongst a plurality of plots of land in a region. The disclosed methods and systems can optionally be implemented in conjunction with the workflow management method and system described in U.S. patent application Ser. No. 13/790,114 filed on a date even herewith by Soubra et al. and titled "Workflow Management Method and System", which is incorporated by reference herein in its entirety.

In an aspect of some embodiments, exemplary methods and systems are provided. The exemplary methods and systems might provide for an image recording device of any type, including, but not limited to, a digital camera, a webcam, a camera mounted on an aircraft, a satellite camera, a computer or mobile device having camera functionality, a video camera, or other suitable imaging device. The image recording device may be used to capture an image of an object, landmark, structure, or person on a plot of land. In some embodiments, the captured image may be sent to and stored in the memory of a local computer system (e.g., a desktop computer, a laptop computer, and/or a mobile device, etc.). The local computer system may then access and send the stored image to a remote computer system via a network. Representative networks include, but are not limited to, the Internet, a public switched telephone network ("PSTN"), a private network, an Intranet, a local area network ("LAN"), a wide area network ("WAN"), or the like. According to some embodiments, the remote computer system might isolate one or more objects in the captured image for identification. For each object, the remote computer system might execute an image comparison software application, which accesses—and compares the one or more objects in the captured image against— dozens, hundreds, thousands, millions, or any suitable number of images or videos images from external image databases. The external image databases can be of any type including, but not limited to, free online image databases such as Google® Image Search™, Google® Picasa®, Flickr®, PicSearch™, Facebook®, Webshots®, SmugMug®, Photobucket®, YouTube®, and the like. In alternative embodiments, rather than the use of external image databases, private databases may be used. For example, a service provider may offer free or paid subscription service access to the private database for customers. The remote computer system may identify a set of preexisting digital images from the external image databases and/or from the private databases that match each of the one or more objects in the captured image, and may determine one or more keyphrases. Keyphrases, as used herein, may include a single word or a phrase having one or more words that may be associated with the preexisting digital images.

In some embodiments, once one or more keyphrases have been determined, a search may be made of similar images in one or more external image databases and/or in one or more private databases based on the determined keyphrases. In such a manner, the determined keyphrases may be confirmed. In other embodiments, the remote computer system might generate a point cloud for each of the one or more objects in the captured image, while the external image databases may be searched for available 3D models to which the generated point cloud might be fitted. Once each object is identified based on the fitting of the point cloud with the available 3D models, the determined keyphrases and the determined identity might be compared to determine if they match. If so, the keyphrases and the identity of each object may be sent to a user for confirmation. If the user rejects the keyphrases or identify, or if the keyphrases do not match the identity, then various steps of the process or the entire process may be repeated. After obtaining a confirmed keyphrase/identity of each object, the remote computer system might associate the confirmed keyphrase/identity with the corresponding object in the image. This information may subsequently be sent to a secondary software application, including, without limitation, a land survey application, an architectural survey application, a geographic information system ("GIS") application, a cadastral survey application, an object recognition software application, a person identification application, or the like running on the local computer system. In some embodiments, an image may be extracted from a 3D point cloud, which might be captured using a scanner. The image, which may be in color or in grey-scale, may be used as the basis for the identification. In such an example, the image might come, not from a "2D camera," but from a "3D camera."

FIGS. 1-8 illustrate some of the features of the method and system for image identification or image recognition referred to above. The methods and systems illustrated by FIGS. 1-8 refer to examples of different embodiments that include various components and steps, which can be considered alternatives or which can be used in conjunction with one another in the various embodiments. The description of the illustrated methods and systems shown in FIGS. 1-8 is provided for purposes of illustration and should not be considered to limit the scope of the different embodiments.

FIG. 1 is a generalized system diagram illustrating an aspect of a system 100 for performing image identification. In FIG. 1, system 100 might comprise one or more image recording devices 105, one or more local computer systems 110, a network 115, a communications relay system 120, a remote computer system 125, the Internet 130, remote servers 135, remote databases 140, and an aircraft 145. Some of the above elements of the system 100 might be duplicated in alternative embodiments.

The one or more image recording devices 105 may include one or more of a digital single-lens reflex ("SLR") camera 105a, a non-SLR digital camera 105b, a tablet computer 105c, a smart phone 105d, a mobile phone 105e, or a webcam 105f, an aerial survey camera 145a, or any other suitable camera or imaging device. Images captured using an image recording device 105 may be sent to a local computer 110. The local computer 110 can be any type of computer, including, but not limited to, a desktop computer or personal computer ("PC") 110a, a laptop computer 110b, or a mobile device 110c, etc. The image recording device 105 may be connected to the local computer 110 either directly via cable connection or short-range wireless connection, such as a WiFi or Bluetooth™ connection, or indirectly via communications relay system 120, which may include communications tower 120a, satellite 120b, or any suitable communications path. The mobile device 110c, according to some embodiments, might include, without limitation, a tablet computer 105c, a smart phone 105d, or a mobile phone 105e. In some examples, an aircraft 145 with camera 145a mounted thereon may be used to obtain an image of objects, structures, landmarks, or persons from the air, in which case, the images captured by camera 145a may be transmitted to the local computer 110 via either tower 120a, satellite 120b, or other suitable communications path. According to some embodiments, images captured by personal communications devices or mobile devices 110c need not be sent to local computers 110a or 110b (as described, for example, in the embodiment of FIG. 7 below). In some embodiments, webcam 105f may be integrated within a local computer 110, while in other embodiments, webcam 105f may be an external "plug-and-play" webcam.

Images sent to local computer system 110 might be stored in a recording medium located at the local computer system 110 or at an external recording medium that may be operatively coupled to the local computer system 110. When accessed, the images may be sent to remote computer system 125 via network 115. Network 115 may be implemented as a combination of networks, including but not limited to the Internet 130, a public switched telephone network ("PSTN"), a private network, an Intranet, a local area network ("LAN"), a wide area network ("WAN"), and/or the like, perhaps via communications relay system 120.

At the remote computer system 125, the images might be received and analyzed using an image comparison software application. The image comparison software application may access, via Internet 130, dozens, hundreds, thousands, millions, or any suitable number of preexisting images stored on remote databases 140 (including databases $140_1$, $140_2$, through $140_n$) that are accessible via remote servers 135 (including servers $135_1$, $135_2$, through $135_n$) operatively coupled to remote databases 140. The remote databases 140 may include, but are not limited to, the free online image databases such as noted above. The image comparison software might compare the captured images with the preexisting images stored on remote databases 140 to identify objects, structures, landmarks, or people in the captured images. The identified objects, structures, landmarks, or people in the captured images may subsequently be used in one or more secondary software applications that may include, but are not limited to, a land survey program, an architectural survey program, a GIS program, a cadastral survey program, an object recognition program, a person identification program, or the like, which might be running on the local computer system.

As mentioned above, system 100 can include one or more user computers 110. A user computer 110 can be a general purpose personal computer or PC—including, merely by way of example, desktop computers, tablet computers, laptop computers, handheld computers, and the like—running any appropriate operating system, a workstation computer running any of a variety of commercially-available operating systems, or a combination of computer types. In FIG. 1, user computer 110 is shown as including desktop or PC 110a and laptop computer 110b. User computer 110 may also include tablet computer 105c, any other mobile or personal communications device such as smartphone 105d or mobile phone 105e, or other hardware.

A user computer 110 can also store and/or execute any of a variety of applications, including one or more applications configured to perform operations in accordance with methods provided by various embodiments disclosed herein, as well as one or more office applications, database client or server applications, or web browser applications. Alternatively, a user computer 110 can be any other electronic device, such as a thin-client computer, Internet-enabled mobile telephone, and/or personal digital assistant, capable of any combination of communicating via a network, for example, the network 115 described herein, or displaying and navigating web pages or other types of electronic documents. Although the exemplary system 100 is shown with two user computers 110 and one tablet computer 105c, any number of user computers can be supported.

The network 115 can be any type of network familiar to those skilled in the art that can support data communications using any of a variety of commercially-available (and/or free or proprietary) protocols, including without limitation TCP/IP and the like. Merely by way of example, the network 115 can include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, any other wireless protocol, or any combination of protocols; or any combination of these or other networks. In some embodiments, network 115 and Internet 130 may be embodied as one network.

Embodiments can also include one or more server computers 125 and/or 135. Each of the server computers 125 and 135 may be configured with an operating system, including without limitation any of those discussed above, as well as any commercially (or freely) available server operating systems. Each of the servers 125 and 135 may also be running one or more applications, which can be configured to provide services to one or more clients 110a-110c, or other servers 125 or 135.

Merely by way of example, one or more of the servers 125 or 135 may be a web server, which can be used to process requests for web pages or other electronic documents from user computers 110a and 110b, or mobile devices 110c. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 or mobile devices 110c to perform methods of the invention. The server 125 or 135 may also function as a middleware server that provides content. For example, as discussed in greater detail with respect to FIGS. 2A, 2B, 3, and 4, middleware servers may include a server for accessing preexisting digital images (e.g., module used in blocks 235 and 335), or a server functioning as a content catalog (e.g., local server 240/340 and remote server 250/350), among other middleware servers. Some of the above-mentioned middleware servers may be embodied as one or more integrated or consolidated middleware servers that incorporate several functionalities into single servers. In addition, databases, including image database 245, 255, 345, 355, etc., may be embodied as middleware or database servers.

The server computer 125 or 135, in some embodiments, might include one or more application servers, which can be configured with one or more applications accessible by a client running on one or more of the client computers 110 and/or other servers 125 and 135. Merely by way of example, the server 120 or 135 can be one or more general purpose computers capable of executing programs or scripts in response to the user computers 110 and/or other servers 125 and 135. The programs or scripts may include without limitation web applications that, in some cases, might be configured to perform methods provided by various embodiments. Merely by way of example, a web application can be implemented as one or more scripts or programs written in any suitable programming language, including, but not limited to, Java™, C, C#™ or C++, or any scripting language, including, but not limited to, Perl, Python, or TCL, or any combination of programming or scripting languages. The application servers can also comprise database servers, including without limitation those commercially available from Oracle™, Microsoft™, Sybase™, IBM™, and the like. Such commercially available database servers might be capable of processing requests from clients—which might include, depending on the configuration, dedicated database clients, API clients, web browsers, etc.—running on a user computer 110 and/or another server 125 or 135. In some embodiments, an application server can create web pages dynamically for displaying the information in accordance with various embodiments, such as displaying an image identification/recognition/matching screen for image identification/recognition/matching as one or more web pages. Data provided by an application server may be formatted as one or more web pages, which might comprise HTML, HTML5, JavaScript, etc., for example. In some cases, the data may be forwarded to a user computer 110 via a web server (as described above, for example). In other cases, the data may be formatted as one or more web pages and also forwarded to the user computer 110 or web server. Similarly, a web server might receive one or more of web page requests or input data from a user computer 110, or might forward the one or more of web page requests or input data to an application server, or both. In some cases, a web server may be integrated with an application server.

In accordance with further embodiments, one or more servers 125 or 135 can function as a file server, or can include one or more of the files (e.g., application code, data files, etc.) necessary to implement various disclosed methods. The one or more files may be incorporated by an application running on a user computer 110 and/or another server 125 or 135. Alternatively, a file server can include all necessary files, allowing such an application to be invoked remotely by one or more of a user computer 110 or a server 125 or 135.

It should be noted that the functions described with respect to various servers herein—including without limitation an application server, a database server, a web server, a file server, or the like—can be performed by a single server or a plurality of specialized servers, depending on implementation-specific needs and parameters.

Figure 2A:
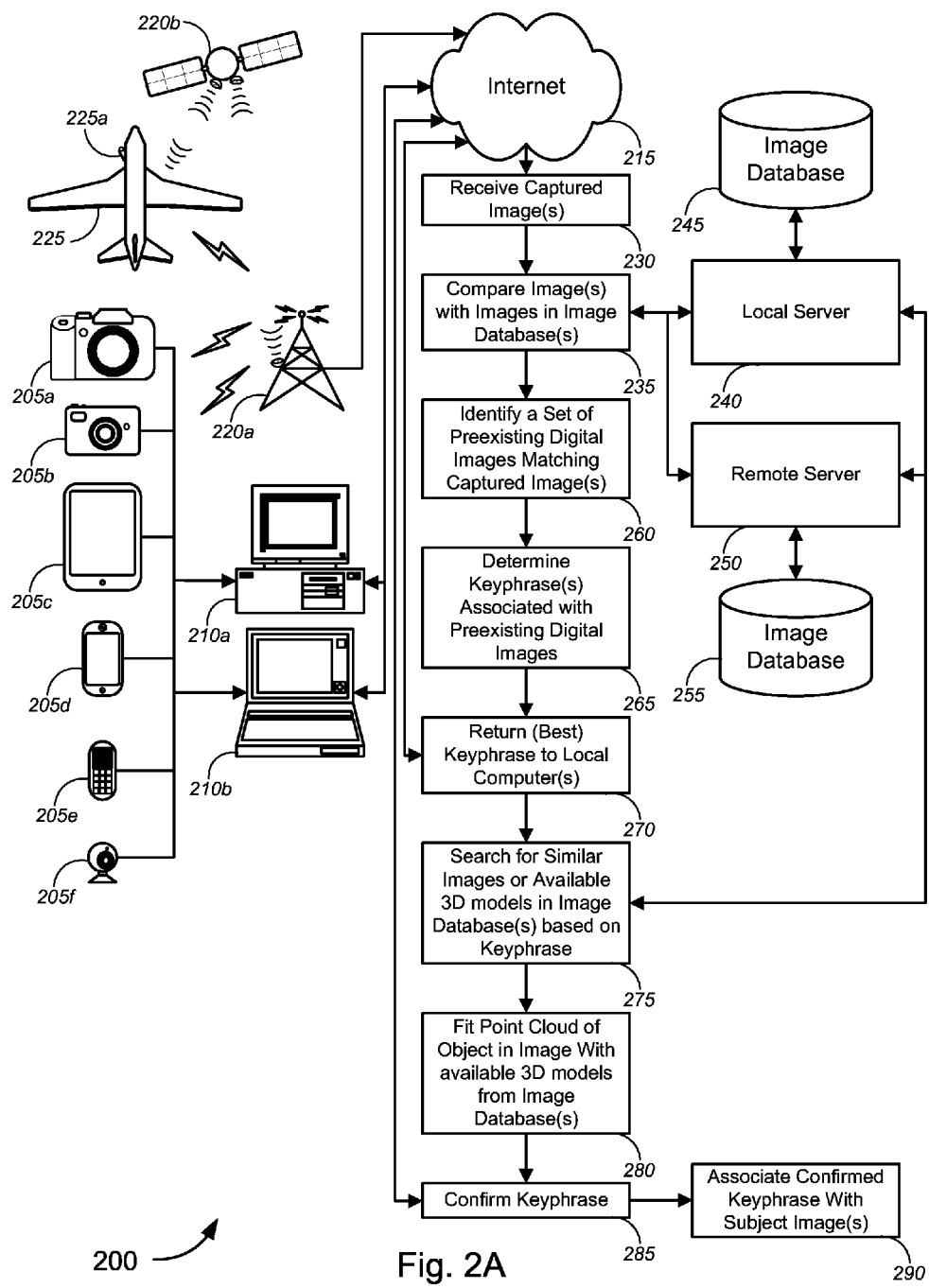
FIGS. 2A-2B are process flow diagrams illustrating an aspect of a system for performing image identification, in accordance with various embodiments.
Figure 2B:
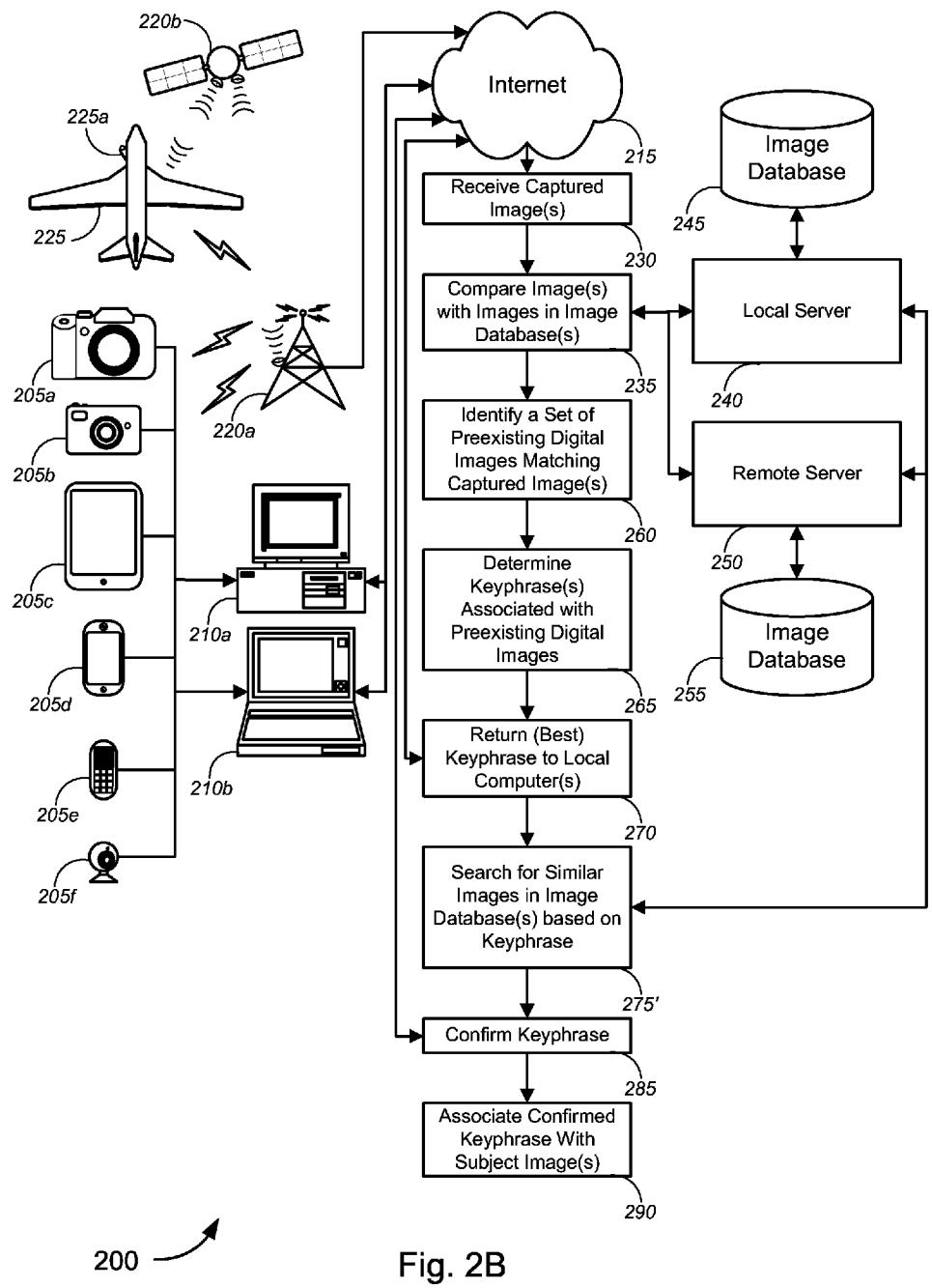
Figure 3:
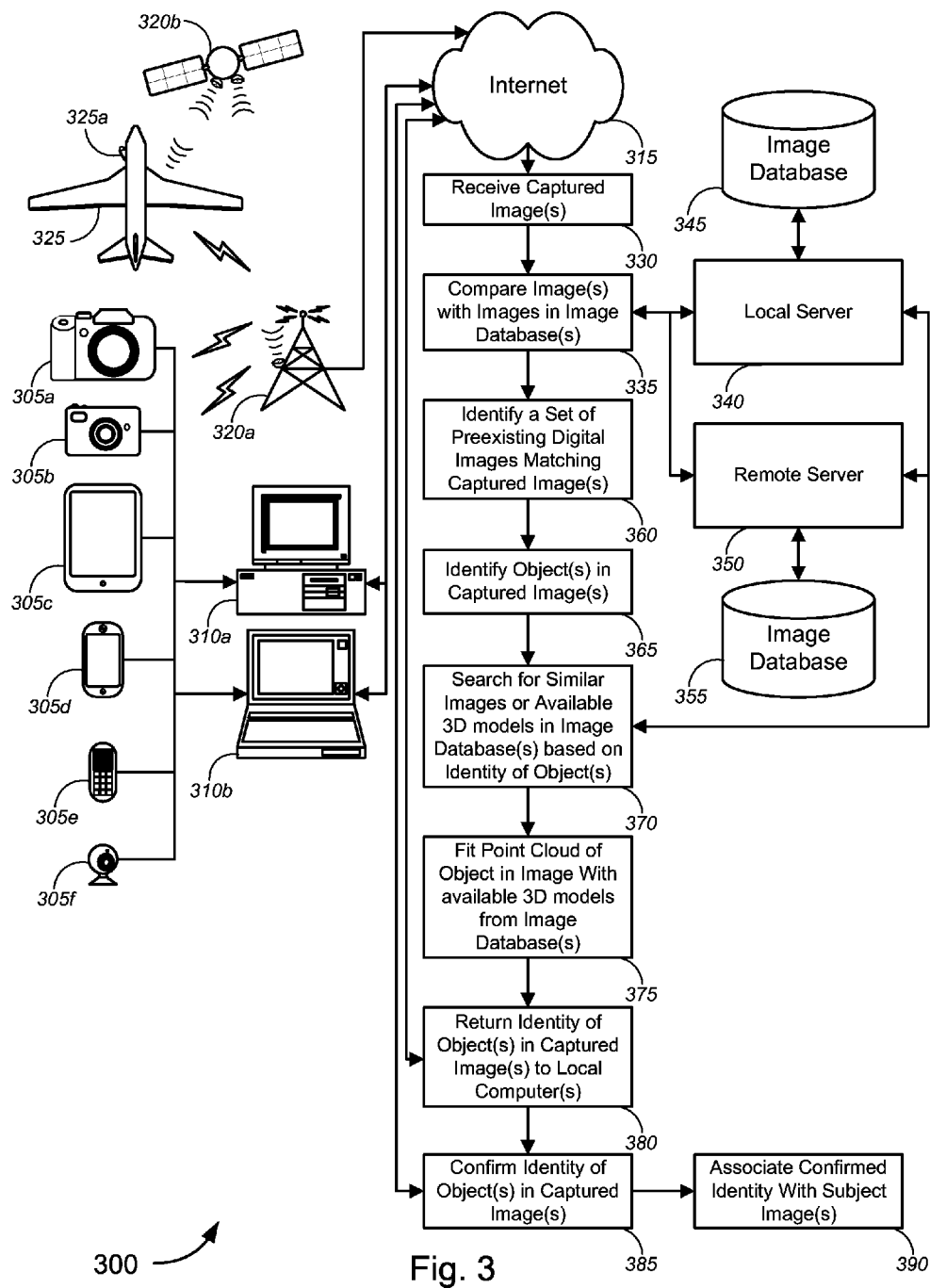
FIG. 3 is a process flow diagram illustrating an aspect of a system for performing image identification, in accordance with various embodiments.

In certain embodiments, the system can include one or more databases including, but not limited to, databases 245, 255, 345, and 355, as described in greater detail with respect to FIGS. 2A, 2B, and 3. The location of each database 245, 255, 345, or 355 is discretionary. Merely by way of example, database 245 or 345 might reside on a storage medium local to, or might be resident in, a server 125. Alternatively, database 255 or 355 can be remote from any or all of the servers 125 and 135 or computers 110, so long as it can be in communication (e.g., via the network 115 or 130, or similar network) with one or more of these servers/computers. In a particular set of embodiments, a database 140, 245, 255, 345, or 355 can reside in a storage-area network ("SAN"). In one set of embodiments, the database 140, 245, 255, 345, or 355 can be a relational database, such as an Oracle database, that is adapted to store, update, and retrieve data in response to SQL-formatted commands. The database might be controlled and/or maintained by a database server, as described above, for example.

Turning to FIGS. 2A and 2B (collectively, "FIG. 2"), FIGS. 2A-2B are process flow diagrams illustrating an aspect of the system 200 for performing image identification. In FIG. 2A, process 200 might comprise capturing or recording an image or video image of an object, structure, landmark, person, or a combination of these subjects, using an image recording device 205. Image recording device 205 can be any type of image recording device including, without limitation, a digital SLR camera 205a, a non-SLR digital camera 205b, a tablet computer 205c, a smart phone 205d, a mobile phone 205e, a webcam 205f, or a video recorder. For any video images that may be recorded, a software application may be used to capture images from the video images, by, for example, extracting one or more frames from the video images and converting the extracted one or more frames into one or more digital images. The captured image may be transmitted to a local computer system 210 either through a wired connection or via wireless connection, as discussed above with respect to FIG. 1. The local computer system 210 may include a desktop computer 210a, a laptop computer 210b, or the like, for storing the capture image on an internal or external recording medium operatively coupled to the local computer system 210. In some cases, the images captured by image recording device 205 may be sent to the local computer system 210 via Internet 215 through communications relay system 220, which might include one or more towers 220a, one or more satellites 220b, or a combination of towers 220a and satellites 220b.

In some embodiments, rather than images being captured from the ground, an aircraft 225 may be used to fly over a region, such as for cadastral, land, GIS, or other surveying work, etc. Camera 225a located or mounted aboard aircraft 225 may be used to capture or record an image or video image of objects, structures, landmarks, or persons on the ground. Images captured by camera 225a may be transmitted to a local computer 210 via one or more towers 220a and/or via one or more satellites 220b. In some cases, transmission of the captured images may be direct to a receiver at the local computer system premises, or may be indirect via a network such as the Internet 215 or other suitable network. Once stored on a recording medium operatively coupled to the local computer system 210, the images may be accessed by the local computer system 210 and transmitted to a remote computer system—such as, for example, remote computer system 125 shown in FIG. 1—via the Internet 215 or other suitable network as discussed above, for processing.

At block 230, the remote computer system might receive the captured image, and compare, at block 235, the captured image with dozens, hundreds, thousands, or millions of images accessed from the image databases. In some embodiments, the remote computer system may query local server 240 to access images stored on local image database 245, while in other embodiments, the remote computer system might query remote server 250 to access images stored on remote image database 255. According to some embodiments, the remote computer system might access images stored on both the local image database 245 and the remote image database 255, via local server 240 and remote server 250, respectively. Comparison of the images may be performed using any type of comparison technique—including, but not limited to, edge detection, histogram comparison, point cloud analysis, or the like, or any combination of techniques.

The remote computer system may, at block 260, identify a set of preexisting digital images that match the captured image. At block 265, the remote computer system might determine one or more keyphrases associated with the preexisting digital images. A keyphrase might be a single word or a phrase comprising two or more words. In some embodiments, the one or more keyphrases may be compiled by identifying—such as by count, frequency, association, or the like—words or phrases that appear near or in relation to the preexisting digital images in the image databases.

At block 270, if there is only one determined keyphrase associated with the preexisting images, then the remote computer system might return the determined keyphrase to the local computer system 210 for the user to confirm or reject the determined keyphrase. If there is more than one determined keyphrase, however, the remote computer system might determine the best match keyphrase, by performing matching techniques including, but not limited to, selecting the most frequent word or phrase that are associated with the preexisting digital images, or the like. The remote computer might subsequently send the best match keyphrase to the user at the local computer system 210 for confirmation or rejection of the best match keyphrase.

According to some embodiments, the remote computer system might wait for confirmation or rejection of the (best match) keyphrase, or might proceed to perform a search of similar images or available 3D models in a 3D warehouse in the local image database 245, the remote image database 255, or both databases, based on the (best match) keyphrase (block 275). If 3D models are available that are similar to the captured image, then the remote computer system might, at block 280, generate a point cloud of each object in the captured image, and fit the point cloud with the available 3D models to identify each object. By fitting the point cloud with the available 3D models, the scene may automatically be modeled. At block 285, the (best match) keyphrase may be confirmed by at least one of receiving a confirmation of the (best match) keyphrase from the user at the local computer system 210, matching the (best match) keyphrase obtained at block 265 with the identity of each object obtained at block 280, or a combination of these two types of confirmation. If the (best match) keyphrase is not confirmed, one or more steps in the process 200 may be repeated. Once confirmed, the (best match) keyphrase might be associated with the subject image or with the subject objects in the captured image.

FIG. 2B is similar to FIG. 2A, except that rather than searching and fitting of the 3D models using generated point clouds of the one or more objects in the captured image, the remote computer system might search for similar images in the local image database 245, the remote image database 255, or both databases, based on the keyphrase (block 275'). Otherwise, the various steps in FIG. 2B are similar, if not identical, to those in FIG. 2A as described above.

FIG. 3 is a process flow diagram illustrating an aspect of the system 300 for performing image identification. FIG. 3 is similar to FIG. 2A, except that rather than determining and sending a (best match) keyphrase, per se, an identification of the one or more objects in the captured image is performed.

In particular, in FIG. 3, image recording devices 305—which may include a digital SLR camera 305a, a non-SLR digital camera 305b, a tablet computer 305c, a smart phone 305d, a mobile phone 305e, or a webcam 305f—might capture or record an image or video image of an object, structure, landmark, person, or a combination of these subjects. The captured image may be transmitted to a local computer system 310 either through a wired connection or via wireless connection, as discussed above with respect to FIG. 1. The local computer system 310 may include a desktop computer 310a, a laptop computer 310b, or the like, for storing the capture image on an internal or external recording medium operatively coupled to the local computer system 310. In some cases, the images captured by image recording device 305 may be sent to the local computer system 310 via Internet 315 through communications relay system 320, which might include one or more towers 320a, one or more satellites 320b, or a combination of towers 320a and satellites 320b.

In some embodiments, rather than images being captured from the ground, an aircraft 325 may be used to fly over a region, such as for cadastral, land, GIS, or other surveying work, etc. Camera 325a located or mounted aboard aircraft 325 may be used to capture or record an image or video image of objects, structures, landmarks, or persons on the ground. Images captured by camera 325a may be transmitted to a local computer 310 via one or more towers 320a and/or via one or more satellites 320b. In some cases, transmission of the capture images may be direct to a receiver at the local computer system premises, or may be indirect via a network such as the Internet 315 or other suitable network. Once stored on a recording medium operatively coupled to the local computer system 310, the images may be accessed by the local computer system 310 and transmitted to a remote computer system—such as, for example, remote computer system 125 shown in FIG. 1—via the Internet 315 or other suitable network as discussed above, for processing.

At block 330, the remote computer system might receive the captured image, and compare, at block 335, the captured image with dozens, hundreds, thousands, or millions of images accessed from the image databases. In some embodiments, the remote computer system may query local server 340 to access images stored on local image database 345, while in other embodiments, the remote computer system might query remote server 350 to access images stored on remote image database 355. According to some embodiments, the remote computer system might access images stored on both the local image database 345 and the remote image database 355, via local server 340 and remote server 350, respectively. Comparison of the images may be performed using any type of comparison technique—including, but not limited to, edge detection, histogram comparison, point cloud analysis, or the like, or any combination of techniques.

The remote computer system may, at block 360, identify a set of preexisting digital images that match the captured image. At block 365, the remote computer system might identify one or more objects in the captured image. The remote computer system might subsequently perform a search of similar images or available 3D models in the local image database 345, the remote image database 355, or both databases, based on the identification obtained at block 365 (block 370). If 3D models are available that are similar to the one or more objects in the captured image, then the remote computer might, at block 375, generate a point cloud of each object in the captured image, and fit the point cloud with the available 3D models to identify each object. At block 380, the remote computer system might return an identity (thus confirmed) of the one or more objects in the captured image to the local computer 310.

According to some embodiments, the remote computer system might, at block 385, confirm the identity of the one or more objects in the captured image by seeking confirmation or rejection of the identity from the user at the local computer 310. If confirmed by the user, the identity of each object may be associated with the corresponding object in the captured image (block 390).

Figure 4:
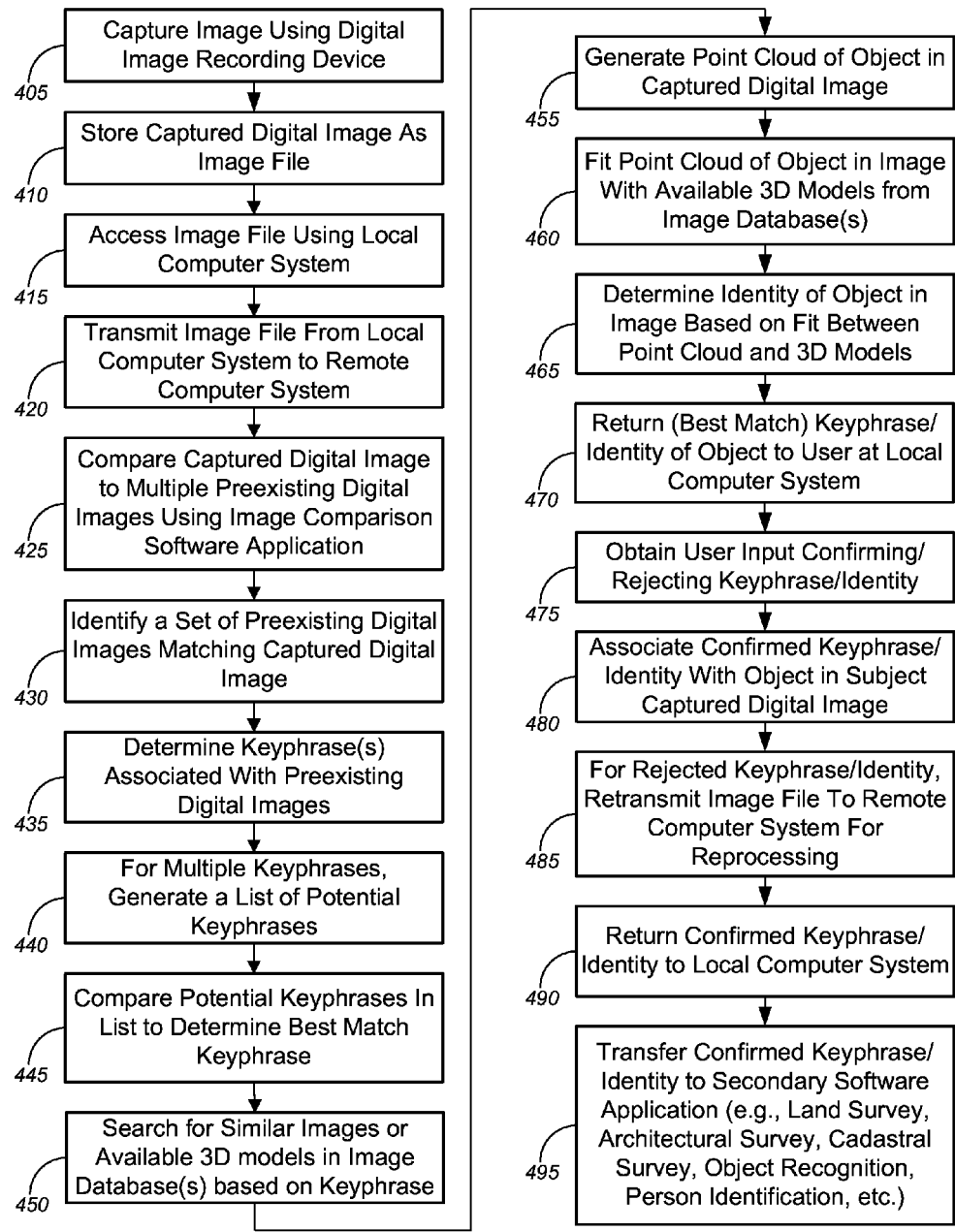
FIG. 4 is a flow chart illustrating an exemplary process of identifying objects in an image, in accordance with various embodiments.

FIG. 4 is a flow chart illustrating an exemplary process 400 of identifying objects in an image. At block 405, process 400 might comprise capturing an image using a digital image recording device, including, without limitation, a digital SLR camera 105a, a digital camera 105b, a tablet computer 105c, a smart phone 105d, a mobile phone 105e, a webcam 105f, or a camera 145a mounted on aircraft 145, as shown in FIG. 1, or similar image recording devices shown in FIGS. 2A, 2B, and 3. The captured digital image, at block 410, might be stored as an image file, either in a recording medium on the digital image recording device or in a recording medium internal or external to, while operatively coupled to, a local computer system. The local computer system might include, but is not limited to, a desktop computer 110a, a laptop 110b, or a mobile device 110c, as shown in FIG. 1, or a similar computer system shown in FIGS. 2A, 2B, and 3. The local computer system might be used to access the stored image file (block 415), and to transmit the image file to a remote computer system, such as remote computer system 125 shown in FIG. 1 (block 420).

At block 425, the remote computer system might compare the captured digital image in the image file to multiple preexisting digital images using an image comparison software application running on the remote computer system. Based on this comparison, the remote computer system might identify a set of preexisting digital images matching the captured digital image (block 430); in some embodiments matching of the images may include matching objects in the captured image or matching a substantial portion of the captured image. The remote computer system or the image comparison software application might, at block 435, determine one or more keyphrases associated with the preexisting digital images, for example, by identifying words or phrases that appear near or in relation to the preexisting digital images in the image databases. Such determination might be performed by, for example, identifying the words or phrases according to count, frequency, association, or the like. For multiple keyphrases, the remote computer system might generate a list of potential keyphrases (block 440), and might compare the potential keyphrases in the list to determine the best match keyphrase. The comparison of potential keyphrases may be performed by using matching techniques, including, but not limited to, selecting the most frequent word or phrase that are associated with the preexisting digital images, or the like (block 445).

At block 450, the image comparison software application might search for similar images and/or available 3D models in the image databases based on the (best match) keyphrase. If any 3D models are found based on the keyphrase, the image comparison software application might, at block 455, generate a point cloud of each object in the captured digital image, fit the point cloud with the available 3D models (block 460), and determine the identity of each object in the image based on the fit between the point cloud and the 3D models (block 465).

At block 470, the remote computer system might return the (best match) keyphrase and/or the identity of the one or more objects in the captured image to the user at the local computer system, while prompting the user to confirm or reject the (best match) keyphrase and/or the identity of the one or more objects. The local computer system might obtain, and transmit to the remote computer system, user input confirming or rejecting the keyphrase/identity, at block 475. If confirmed by the user, the keyphrase/identity may be associated with the corresponding object in the subject captured digital image in the image file (block 480). On the other hand, if the keyphrase/identity is rejected by the user, the remote computer system might, at block 485, request the image file to be retransmitted from the local computer system for reprocessing, which substantially repeats blocks 420-475.

Once the keyphrase/identity of the one or more objects has been confirmed by the user, the confirmed keyphrase/identity of the one or more objects might be returned to the local computer system (block 490), where the confirmed keyphrase/identity of the one or more objects may be transferred to and used by a secondary software application, which might be running on the local computer system (block 495). The secondary software application might include, but is not limited to, a land survey application, an architectural survey application, a GIS application, a cadastral survey application, an object recognition software application, a person identification application, or the like.

FIGS. 5A-5E (collectively, "FIG. 5") represent a system flow diagram illustrating exemplary processes performed at or by components of a system in order to identify objects, structures, landmarks, or persons in digital images. The process in FIG. 5A continues onto FIG. 5B, linked by the circular marker denoted by "A." Similarly, the process in FIG. 5B continues onto FIG. 5C, linked by the circular marker denoted by "B." The process in FIG. 5C continues onto FIG. 5D, linked by the circular marker denoted by "D," while the process in FIG. 5D continues onto FIG. 5E, linked by the circular marker denoted by "G." Circular markers denoted by "C," "E," "F," and "H" link to earlier blocks in the process 500.

Figure 5A:
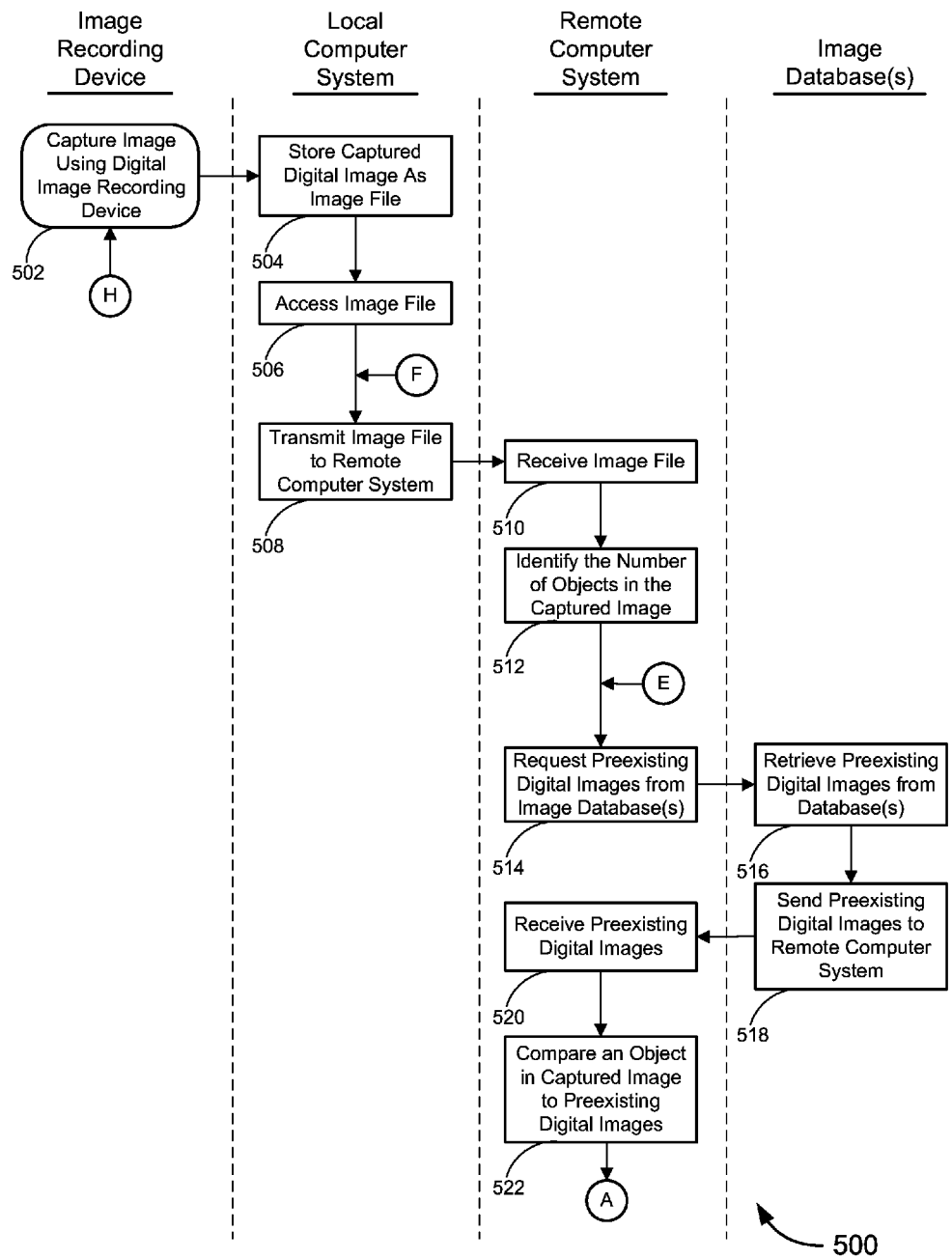
FIGS. 5A-5E represent a system flow diagram illustrating exemplary processes performed at or by components of a system in order to identify objects or persons in an image, which can be used in accordance with various embodiments.

In FIG. 5A, the process 500 may begin at block 502 with the capturing or recording of an image or a video image by one or more image recording devices. The one or more image recording devices might include, without limitation, a digital SLR camera 105a, a non-SLR digital camera 105b, a tablet computer 105c, a smart phone 105d, a mobile phone 105e, a webcam 105f, or a camera 145a mounted on aircraft 145, as shown in FIG. 1, or similar image recording devices shown in FIGS. 2A, 2B, and 3. For video images, digital images may be extracted from one or more frames of the video images for processing. After capturing digital images, or extracting digital images from a video image, the captured/extracted images may, in some embodiments, be stored on a recording medium within or coupled to the one or more image recording devices.

At block 504, the digital image may be transferred to and stored as an image file on a recording medium within or coupled to the local computer system, which may include one of a desktop 110a, a laptop 110b, or a mobile device 110c, as shown in FIG. 1, or similar computer system shown in FIGS. 2A, 2B, and 3. The image file may then be accessed, at block 506, by the local computer system, and transmitted to a remote computer system, such as remote computer system 125, as shown in FIG. 1 (block 508).

The remote computer system, at block 510, might receive the image file, and might, at block 512, identify the number of objects in the captured image of the image file—e.g., by performing preliminary object identification using techniques, including, but not limited to, edge detection, histogram comparison, point cloud analysis, or the like, or any combination of techniques. At block 514, the remote computer system might request preexisting digital images from image databases. The image databases may include, but is not limited to, databases 140 via servers 135, as shown in FIG. 1; local image database 245 and remote image database 255 via local server 240 and remote server 250, respectively, as shown in FIGS. 2A and 2B; or local image database 345 and remote image database 355 via local server 340 and remote server 350, respectively, as shown in FIG. 3. The preexisting digital images might be retrieved from the image databases (block 516), and sent to the remote computer system (block 518). At block 520, the remote computer system might receive the preexisting digital images, and might transfer these images to an image comparison software application, similar to that as described above with respect to FIG. 4. The image comparison software application, which, at block 522, might compare one of the objects in the captured image to the dozens, hundreds, thousands, or millions of preexisting digital images obtained or accessed from the image databases.

Figure 5B:
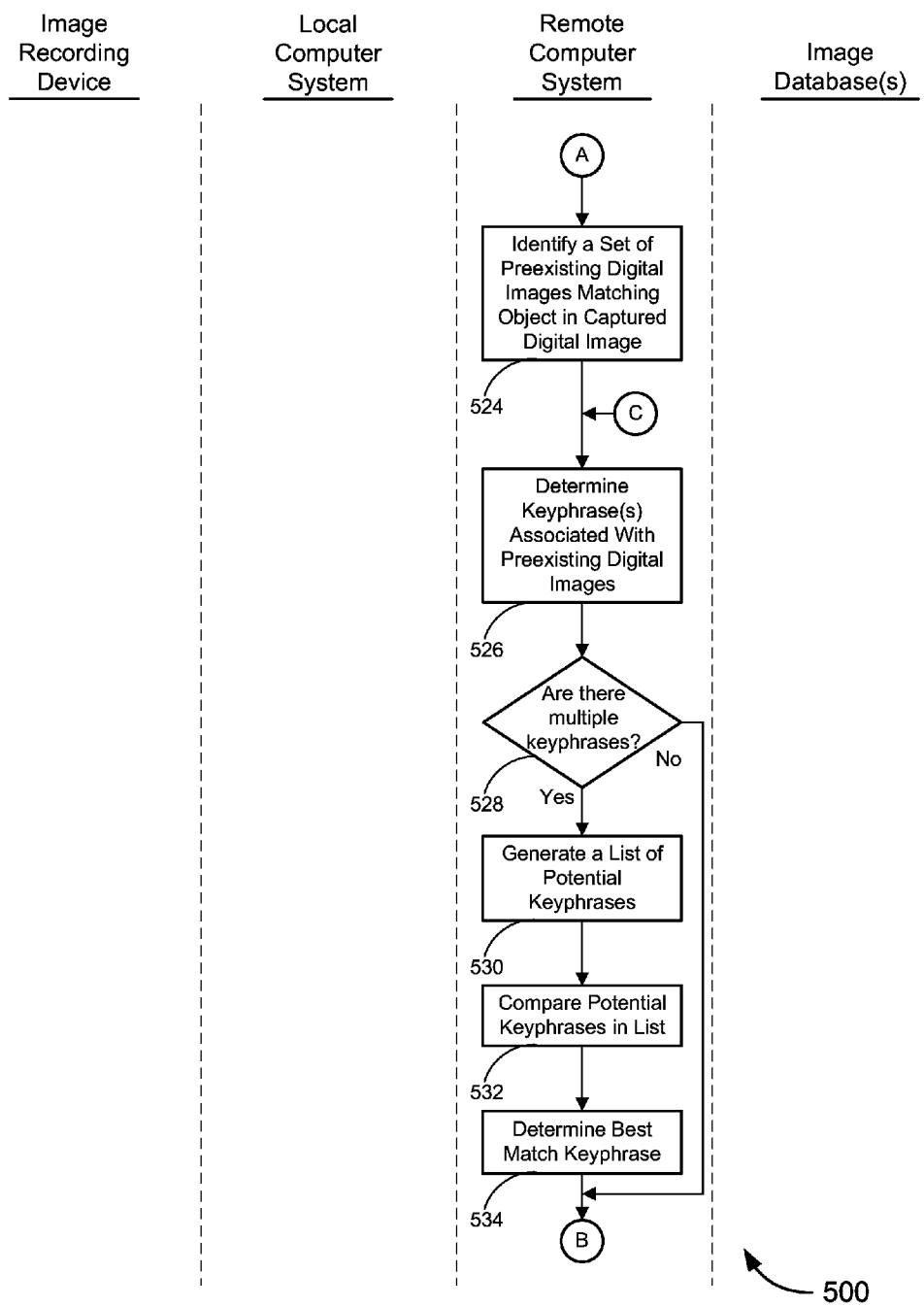

Continuing onto FIG. 5B, the image comparison software application running on the remote computer system might, at block 524, identify a set of preexisting digital images that match the subject object in the captured digital image, from among the dozens, hundreds, thousands, or millions of preexisting digital images obtained from the image databases. The image comparison software application might then determine one or more keyphrases that are associated with the preexisting digital images, for example, by identifying, based on count, frequency, association, or the like, words or phrases that appear near or in relation to the preexisting digital images in the image databases (block 526). At block 528, a determination may be made as to whether there are multiple keyphrases. If not, the process continues to block 536 shown in FIG. 5C. If so, the image comparison software application might generate, at block 530, a list of potential keyphrases. At block 532, the image comparison software application might compare the potential keyphrases in the list, and perform matching techniques. The matching techniques might include, without limitation, selecting the most frequent word or phrase that are associated with the preexisting digital images, or the like. Based on the comparison, the image comparison software application might determine a best match keyphrase (block 534).

Figure 5C:
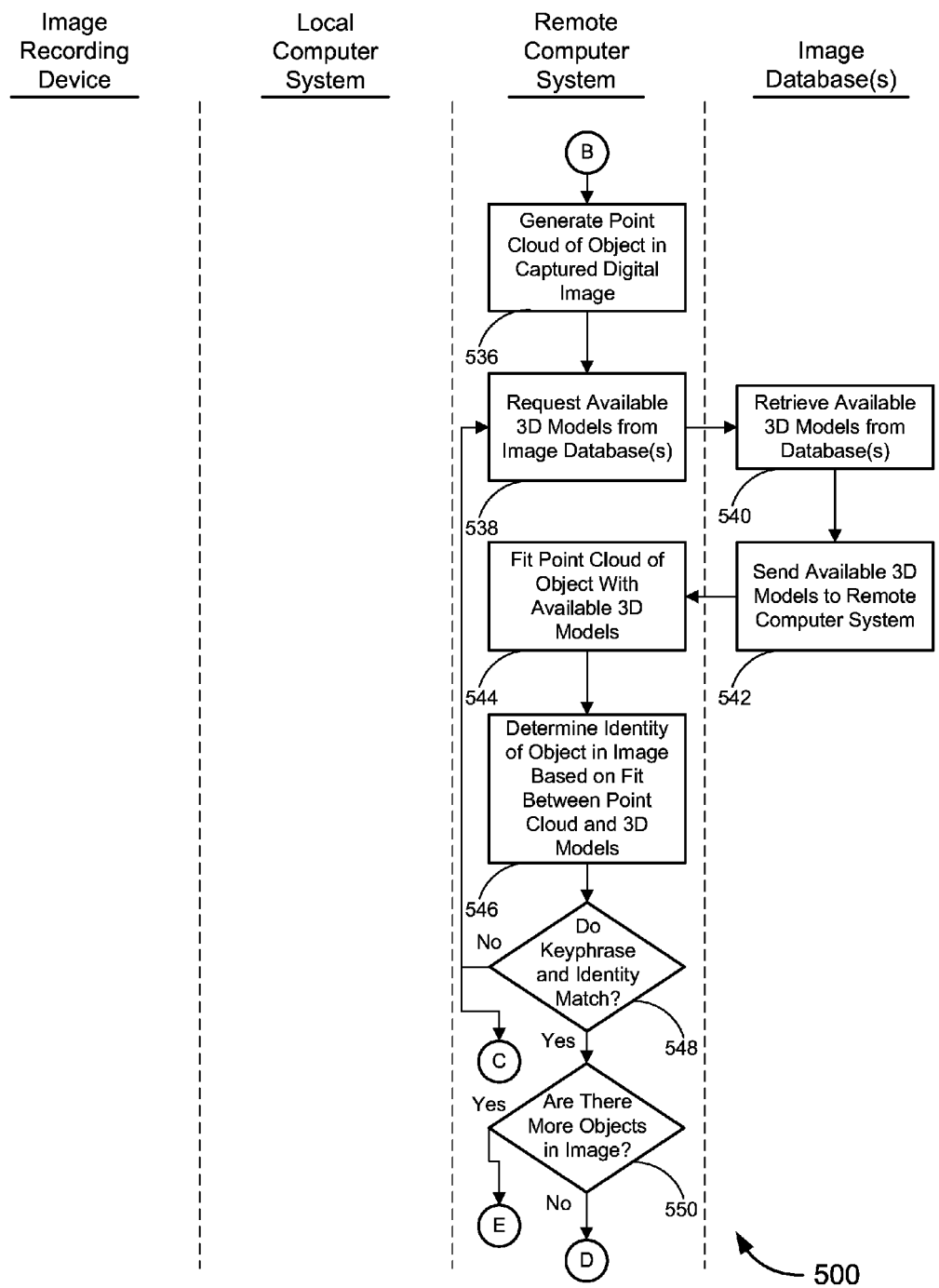

Continuing onto FIG. 5C, the image comparison software application might, at block 536, generate a point cloud of the subject object in the captured digital image, and request available 3D models from the image databases (block 538). At block 540, available 3D models, if any, might be retrieved from the image databases, and sent to the remote computer system (block 542). The image comparison software application might, at block 544, fit the generated point cloud with the available 3D models, and, at block 546, determine an identity of the subject object in the image based on the fit between the point cloud and the 3D models. A determination may then be made at block 548 as to whether the (best match) keyphrase matches the identity as determined at block 546. If not, the process 500 returns to block 538, block 526, or both. If so, the process 500 proceeds to block 550. If there are no 3D models available, however, the process skips blocks 540 through 548, and proceeds to block 550.

At block 550, a determination might be made as to whether there are more objects in the captured image. If so, the process 500 returns to block 514. If not, the process 500 proceeds to block 552, as shown in FIG. 5D.

Figure 5D:
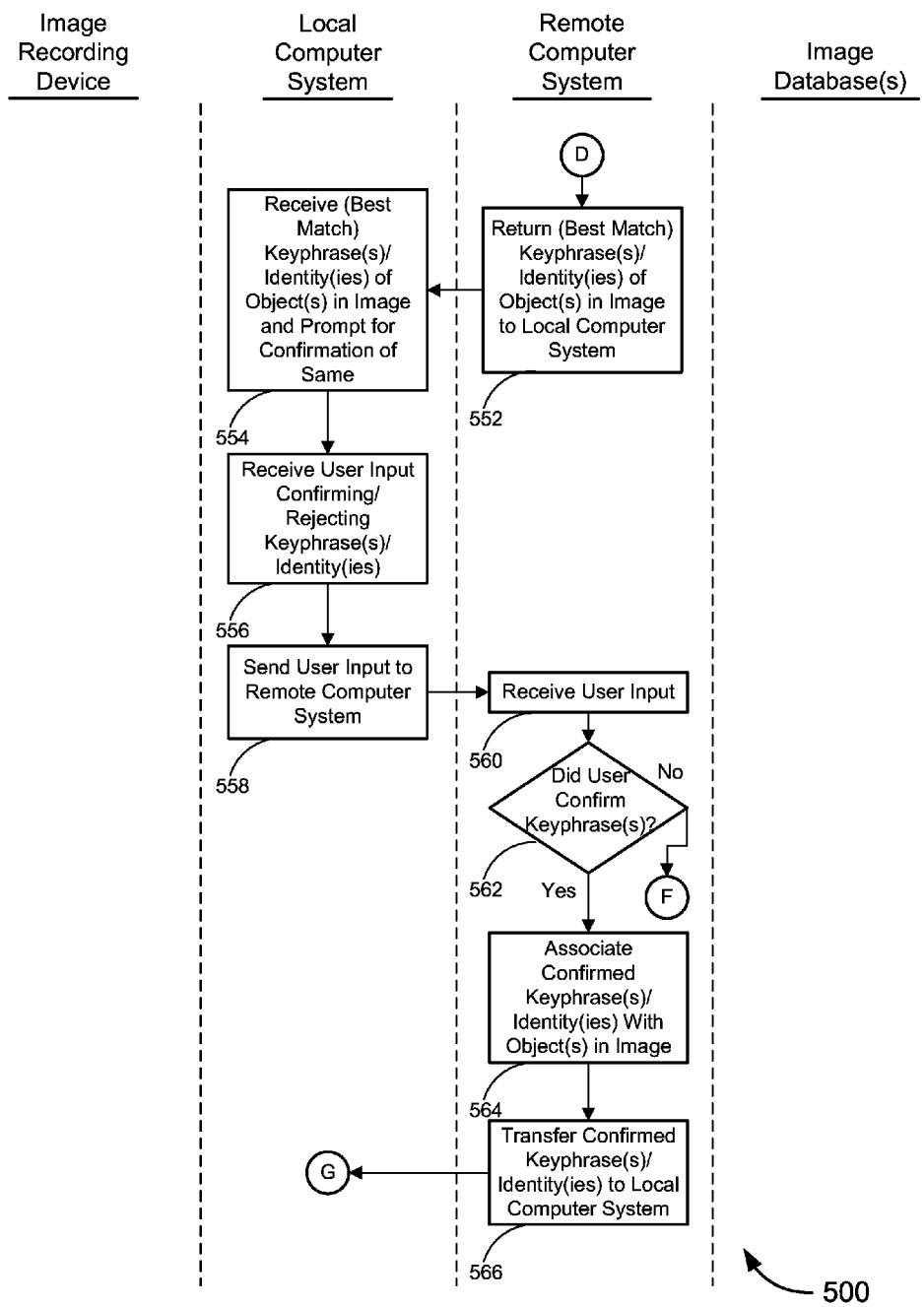

Continuing onto FIG. 5D, the remote computer system might, at block 552, return the (best match) keyphrase and/or identity of each object in the captured image to the local computer system. At block 554, the local computer system might receive the keyphrase/identity of each object, as well as receiving a user prompt for confirmation or rejection of the keyphrase/identity of each object in the image. The local computer system, at block 556, might receive one or more user inputs confirming or rejecting the keyphrase/identity of each object in the image, and, at block 558, send the one or more user inputs to the remote computer system.

At block 560, the image comparison software application might receive the one or more user inputs, and determine, at block 562, whether the user has confirmed the keyphrase/identity of each object in the captured image. For any rejections of the keyphrase/identity of any object, the process 500 might return to block 508, and the process might repeat as to the objects for which the keyphrase and/or identity was rejected by the user. In some embodiments, the entire process from blocks 508 through 562 might be repeated for all the objects in the captured image. For all confirmed keyphrases/identities of objects in the image, the image comparison software application might associate the confirmed keyphrase/identity with each corresponding object in the image (block 564). At block, 566, the image comparison software application might transfer the confirmed keyphrase/identity of each object to the local computer system.

Figure 5E:
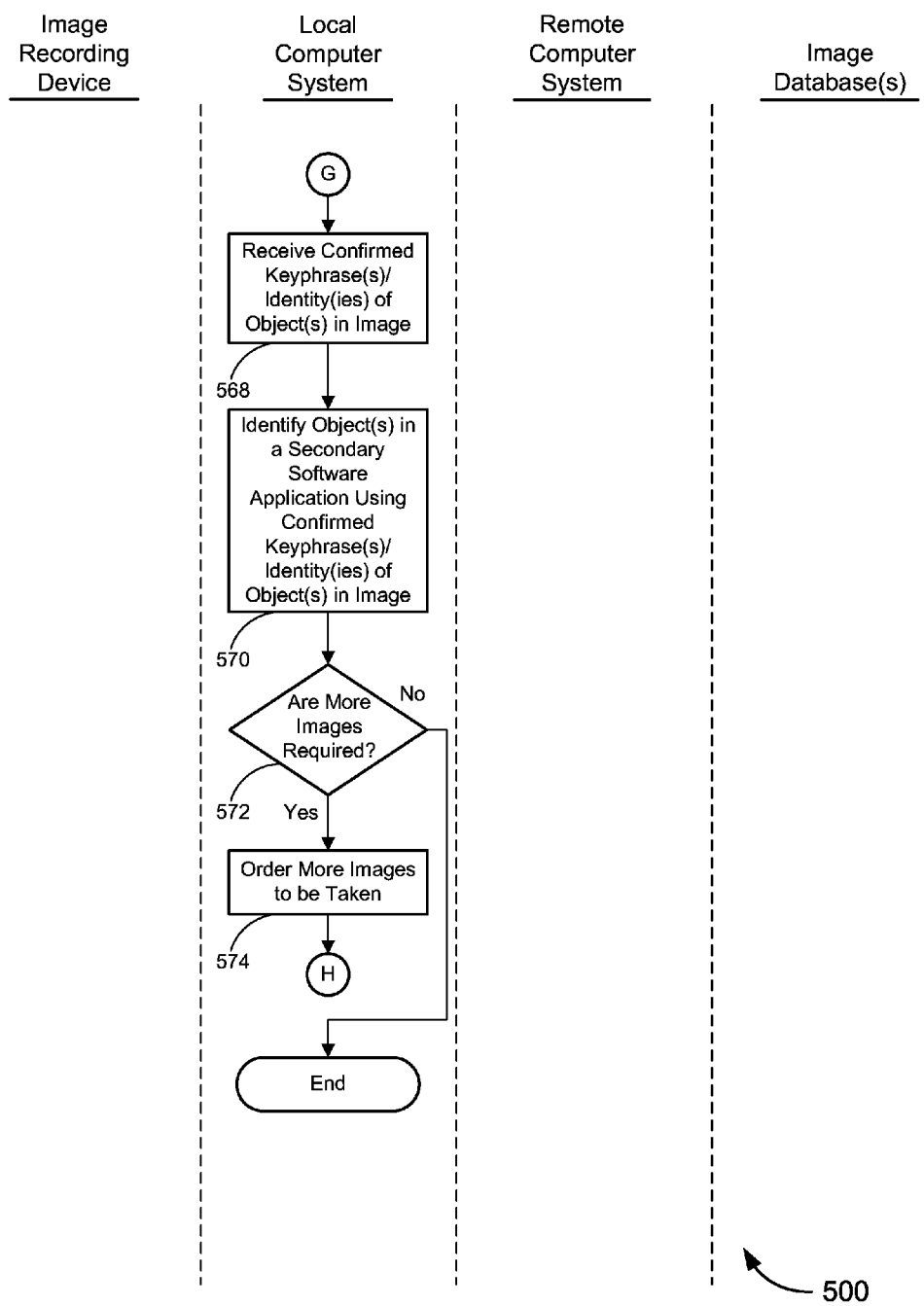

Continuing onto FIG. 5E, the local computer system might receive the confirmed keyphrase and/or identity of each object in the image (block 568), where a secondary software application, which might be running on the local computer system, might identify objects using the confirmed keyphrase/identity of each object or using the association between keyphrase/identity and object (block 570). The secondary software application might include, but is not limited to, a land survey application, an architectural survey application, a GIS application, a cadastral survey application, an object recognition software application, a person identification application, or the like. At block 572, a determination might be made as to whether more images are required. If so, the process 500 returns to block 502. If not, the process terminates.

Although the above process has been described with respect to image identification or recognition of objects, the various embodiments are not so limited, the process 500 may also be used to identify people in the captured images using the same or similar methodology or technique, by following the same steps as outlined above in blocks 502-574. In some embodiments, process 500 may be applied to a cadastral survey application, in which case the object in the captured image may be a surveyed feature. For such embodiments, the keyphrase might be associated with a location on the cadastral survey which corresponds to the surveyed location of the surveyed feature.

Figure 6:
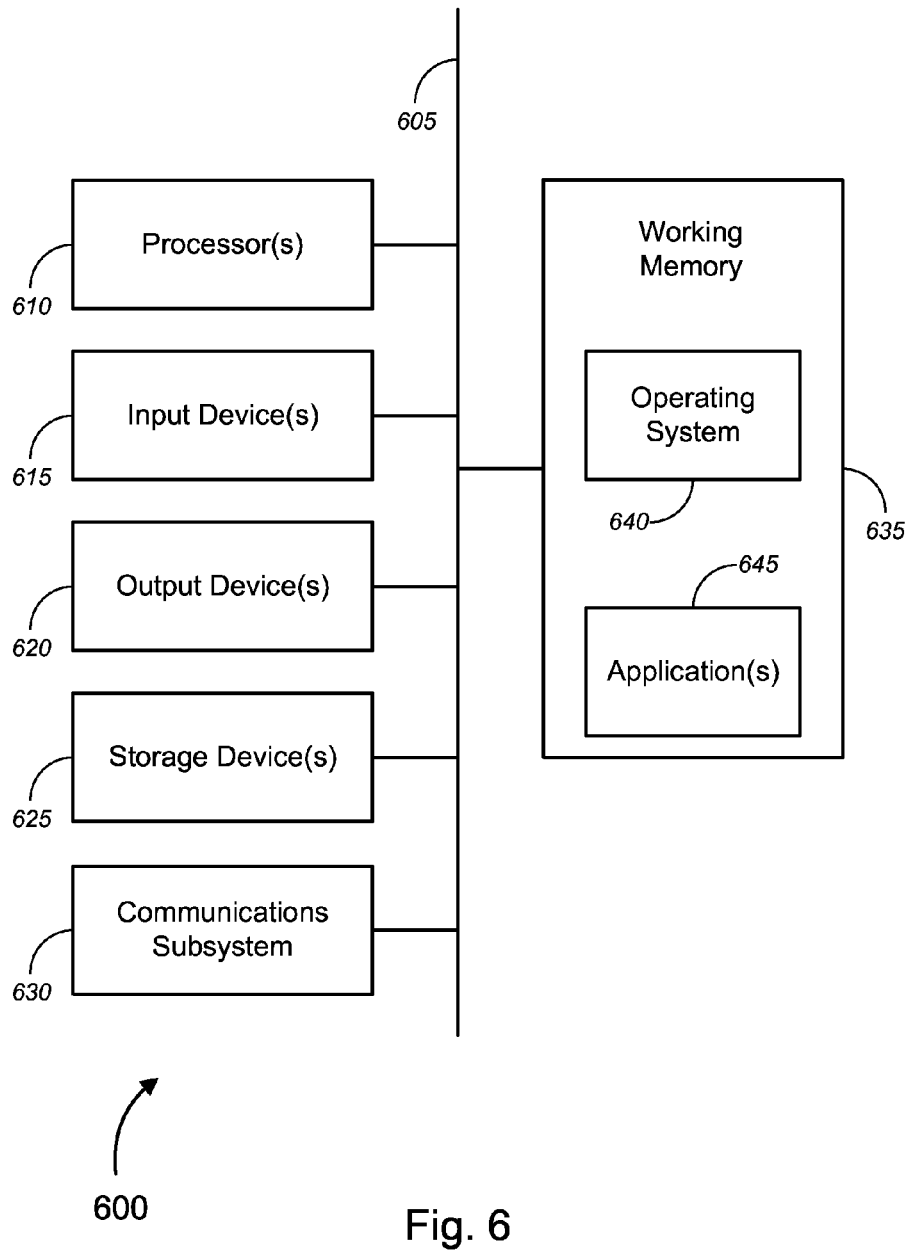
FIG. 6 is a block diagram illustrating an exemplary computer architecture, in accordance with various embodiments.

FIG. 6 is a block diagram illustrating an exemplary computer architecture. FIG. 6 provides a schematic illustration of one embodiment of a computer system 600 that can perform the methods provided by various other embodiments, as described herein, and/or can perform the functions of local computer system 110, 210, or 310, or remote computer system 125, or other computer systems as described above. It should be noted that FIG. 6 is meant only to provide a generalized illustration of various components, of which one or more, or none, of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors, or one or more special-purpose processors such as digital signal processing chips, graphics acceleration processors, or the like; one or more input devices 615, which can include without limitation a mouse, a keyboard, or the like; and one or more output devices 620, which can include without limitation a display device, a printer, or the like.

The computer system 600 may further include, or be in communication with, one or more storage devices 625. The one or more storage devices 625 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 600 might also include a communications subsystem 630, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 630 may permit data to be exchanged with a network (such as network 115, to name an example), with other computer systems, with any other devices described herein, or with any combination of network, systems, and devices. According to some embodiments, network 115 might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, or other code. The software elements may include one or more application programs 645, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device to perform one or more operations in accordance with the described methods.

A set of these instructions or code might be encoded and/or stored on a non-transitory computer readable storage medium, such as the storage devices 625 described above. In some cases, the storage medium might be incorporated within a computer system, such as the system 600. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 600, or might take the form of source or installable code. The source or installable code, upon compilation, installation, or both compilation and installation, on the computer system 600 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 600, to perform methods in accordance with various embodiments of the invention. According to a set of embodiments, some or all of the procedures of such methods might be performed by the computer system 600 in response to processor 610 executing one or more sequences of one or more instructions. The one or more instructions might be incorporated into the operating system 640 or other code that may be contained in the working memory 635, such as an application program 645. Such instructions may be read into the working memory 635 from another computer readable medium, such as one or more of the storage devices 625. Merely by way of example, execution of the sequences of instructions contained in the working memory 635 might cause the one or more processors 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions or code to the one or more processors 610 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630, or the media by which the communications subsystem 630 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Figure 7:
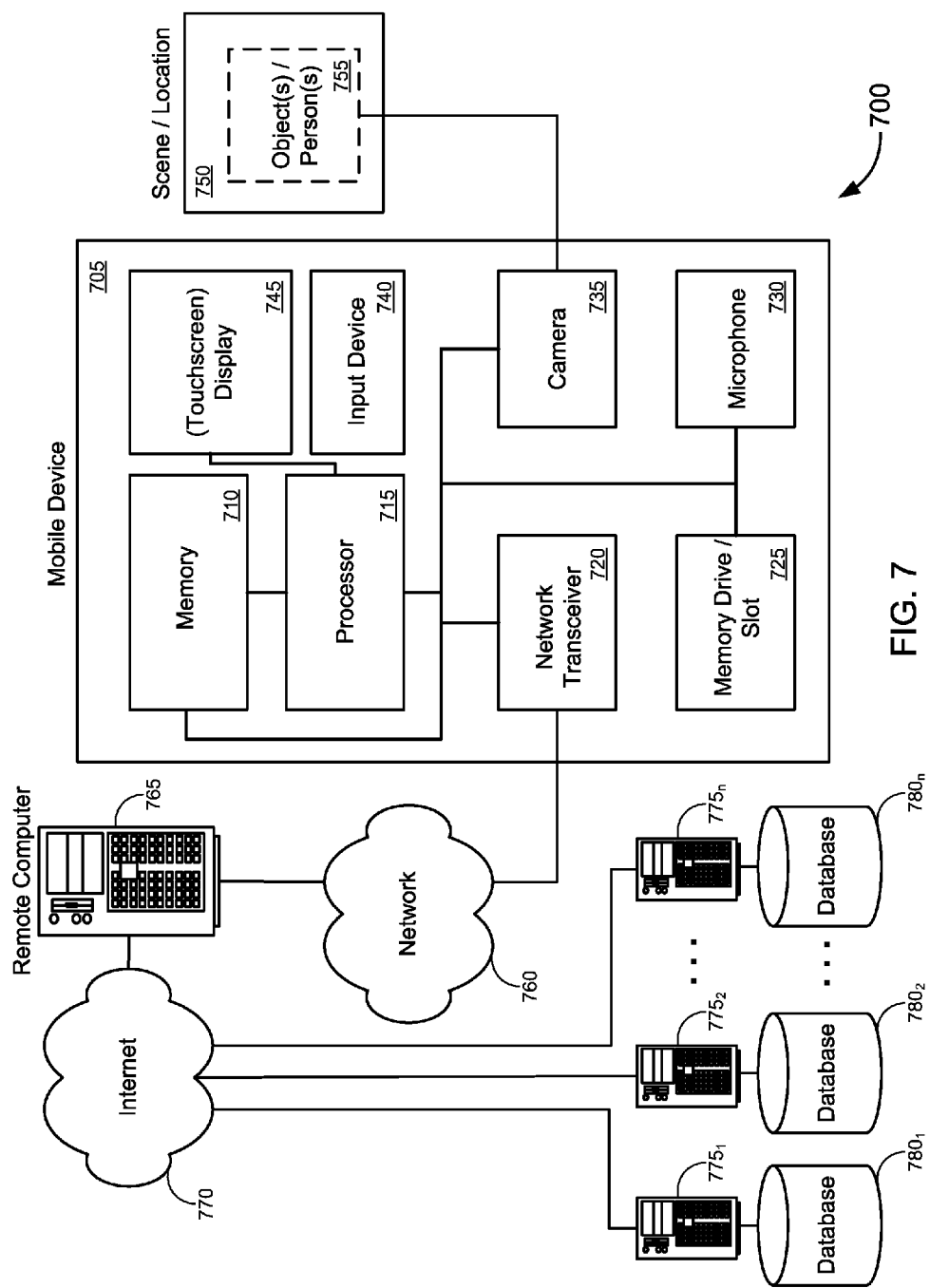
FIG. 7 is a schematic representation of an exemplary image identification system, in accordance with various embodiments.

FIG. 7 is a schematic representation of an exemplary image identification system 700. In FIG. 7, a mobile device 705 may be used both to capture an image of objects, structures, landmarks, or persons, and to run the secondary software application discussed above. The mobile device 705 may include one or more mobile devices 110c, which might include, without limitation, a tablet computer 105c, a smart phone 105d, a mobile phone 105e, or the like. The secondary software application might be running on the mobile device 705, rather than on a local computer system, such as computer system 110a and 110b, as shown in FIG. 1. In such cases, there is no need to send the images to a local computer system such as desktop/PC 110a or laptop 110b, as described in various embodiments above.

As shown in FIG. 7, mobile device 705 might comprise memory 710, one or more processors 715, one or more network transceivers 720, one or more memory slots/drives 725, a microphone 730, one or more cameras 735, one or more input devices 740, and one or more displays 745, or any combination of these components. Memory 710 might include one or more storage devices, which can comprise, without limitation, local or network accessible storage. The one or more storage devices can include, without limitation, a disk drive, a drive array, an optical storage device, a solid-state storage device such as a RAM and/or a ROM, which can be programmable, flash-updateable, or the like, as described above. The one or more processors 715 might include, without limitation, one or more general-purpose processors or one or more special-purpose processors, such as digital signal processing chips, graphics acceleration processors, or the like.

The one or more network transceivers 720 might include, without limitation, a LAN transceiver, including a fiber network transceiver, an Ethernet network transceiver, a Token-Ring™ network transceiver, or the like; a WAN transceiver, a WWAN transceiver, a PSTN transceiver, an infra-red network transceiver; or a wireless network transceiver, such as transceivers compatible with IEEE 802.11 suite of protocols, the Bluetooth™ protocol, or any other wireless protocol.

The one or more memory slots/drives 725 might include, but is not limited to, drives or slots for USB Flash drives, SD cards, or the like. The one or more cameras 735 may include, but is not limited to, charge-coupled devices ("CCDs"), digital still cameras, digital video cameras, phone cameras, optical cameras, other types of semiconductor-based cameras, or any type of image sensor, etc. The one or more input devices 740 might include, without limitation, a physical keypad, a touchscreen virtual keypad, dials, buttons, switches, a joystick, or the like. The one or more displays 745 might include, without limitation, one or more non-touchscreen displays, one or more touchscreen displays, or a combination of non-touchscreen and touchscreen displays. A user might interact with the touchscreen display using one or more fingers, a stylus, or a combination of the two, as known in the art.

Turning back to FIG. 7, the one or more cameras 735 might capture an image of a scene or location 750, in which one or more objects, one or more structures, one or more landmarks, one or more people, or any combination of these subjects may be located. The image may then be stored in the memory 710. Microphone 730 may be used by the user to input voice commands for any combination of recording, storing, or accessing the images. Microphone 730 may also be used for inputting voice commands for executing one or more of the following functions: executing software for sending the images via a network 760 to one or more remote computers 765; verbally confirming/rejecting keyphrases associated with the one or more objects, the one or more structures, the one or more landmarks, or the one or more people in the captured image; and executing and interacting with a secondary software application, which might be executed by the one or more processors 715 of mobile device 705. As discussed above, the secondary software application might include, without limitation, a land survey application, an architectural survey application, a GIS application, a cadastral survey application, an object recognition software application, a person identification application, or the like.

At the one or more remote computers 765, the captured image may be processed in a manner similar as that described above with respect to the embodiments of FIGS. 1-5, for example, by accessing resources through the Internet 770, through servers 775 (including servers $775_1$, $775_2$, through $775_n$), and through image databases 780 (including databases $780_1$, $780_2$, through $780_n$). The databases 780 may include, but are not limited to, online image databases such as discussed above, which are generally accessible to the public without charge over the Internet 770.

Once the one or more objects, one or more structures, one or more landmarks, one or more people, or any combination of these subjects in the captured image have been identified and the keyphrase/identity of each subject has been confirmed by the user, the secondary software application may utilize the confirmed keyphrase/identity of each subject in the captured image in order to perform the intended function or functions. The intended function or functions may include, but are not limited to, a land survey, an architectural survey, a cadastral survey, a GIS functionality, an object recognition, a person identification, or the like.

Figure 8:
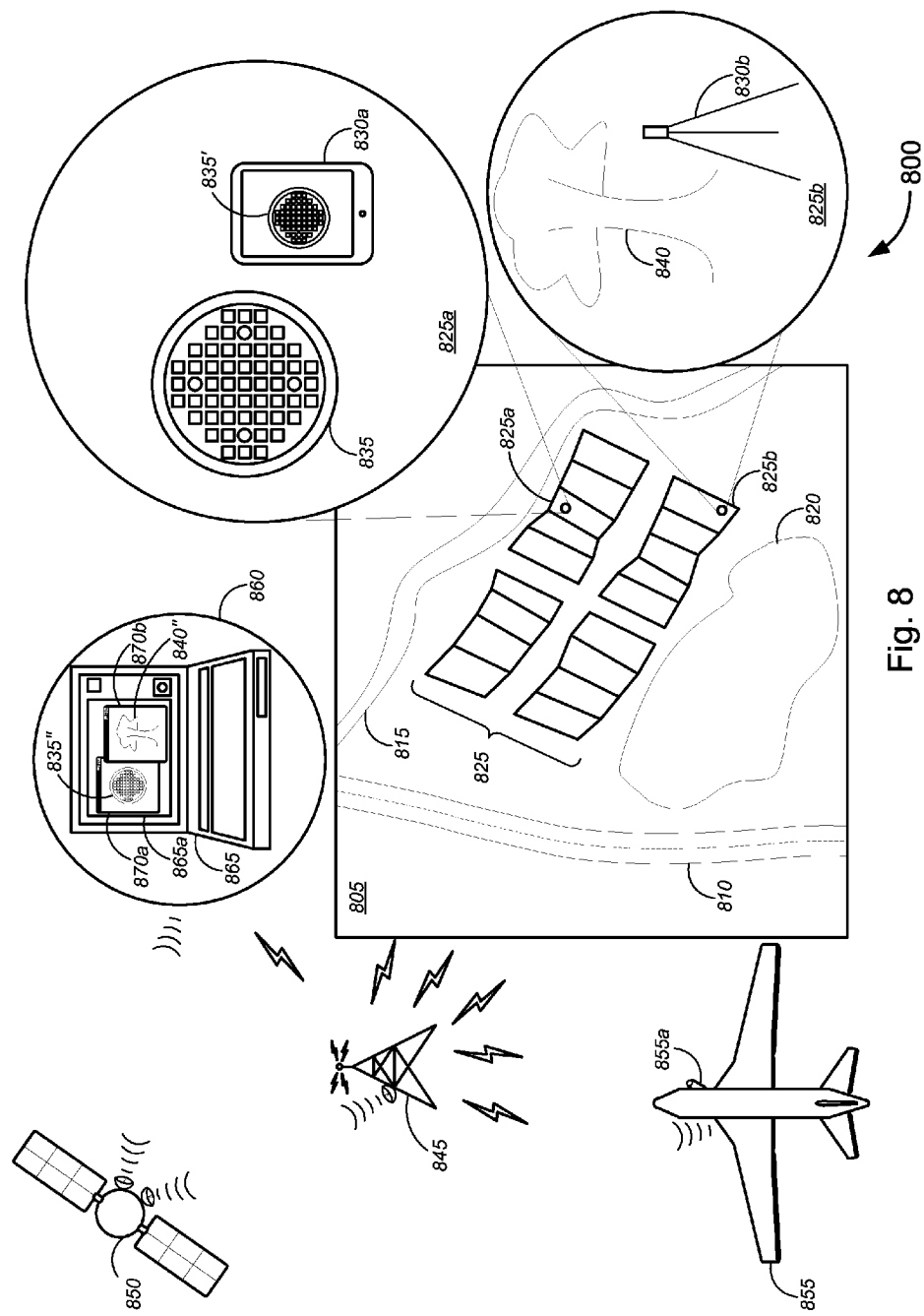
FIG. 8 is a schematic representation of an exemplary image identification system as used in a cadastral survey, in accordance with various embodiments.

We now turn to FIG. 8, which is a schematic representation of an exemplary image identification system 800 as used in a cadastral survey. In this example of the method, it may be desired to establish a cadastre for each of the plots of land 825 shown in location or region 805, which might include, without limitation, one or more roadways or vehicular paths 810, one or more waterways 815, one or more bodies of water 820, and a plurality of plots of land 825. The one or more waterways 815 may include any combination of rivers, streams, or the like, while the one or more bodies of water 820 might include any combination of ponds, lakes, or the like. The plurality of plots of land 825 may include, for example, a residential plot, a commercial plot, farm land, or the like, or a combination of such types of land.

In establishing a cadastre for plot 825a, for instance, a cadastral surveyor using a mobile device 830a might capture or record an image of a natural or man-made landmark, structure, or object found within plot 825a. The mobile device 830a might include, without limitation, a laptop computer, a tablet computer, a smart phone, a mobile phone, or the like. The landmark, structure, or object might mark one corner of the boundaries of the plot 825a, or might simply be found within the plot 825*a*. For example, as shown in the zoomed-in portion of plot 825*a*, a tablet computer 830*a* might capture an image of a manhole cover 835 on the property, with the captured image 835' of the manhole cover 835 being displayed on the display screen of the mobile device 830*a*. Similarly, as shown in the zoomed-in portion of plot 825*b*, a surveying tool 830*b* might capture an image of a tree 840.

The images of the manhole cover 835 and the tree 840 might be sent to a remote computer (not shown) via a communications relay system, including, but not limited to one or more towers 845, one or more satellites 850, or a combination of towers 845 and satellites 850. In some embodiments, an aircraft 855 having a camera 855*a* mounted thereon might be used to take aerial photographs or video images of objects, structures, landmarks, or people on the plots 825, or might obtain aerial images or video images in wider location or region 805. The remote computer might then process the images to identify one or more of the objects, structures, landmarks, persons, or locations captured in the images, in a similar manner as described in detail above with respect to various embodiments shown in FIGS. 1-5. In some embodiments, the captured images may be stored for quality control purposes, so as to allow a user to later return to the analysis and trace any issue in the case that there might be a problem with the image identification process. In addition to the various methods and processes described in the various embodiments above, the images may concurrently or at a later time be sent, via the one or more towers 845 and/or the one or more satellites 850, not only to the cadastral surveyors at plots 825, but also to a regional/national cadastral office 860 located some distance away, perhaps in another region of the country, province, state, continent, etc. At the regional/national cadastral office 860, a cadastral worker might use a user computer 865, including a PC, a laptop computer, a mobile device, or the like. On one or more display windows 870 presented on display screen 865*a* of the user computer 865, the cadastral worker might view any combination of images and information related to the cadastral surveys being conducted at plots 825. For example, as shown on display screen 865*a*, two operational windows or graphical user interfaces ("GUIs") 870 might be presented. In window 870*a*, an image 835" of the manhole cover 835 taken at plot 825*a* may be displayed. Concurrently, an image 840" of the tree 840 that was taken at plot 825*b* may be shown.

From the regional/national cadastral office 860, the cadastral worker may order more images to be taken by the on-the-ground surveyors at plots 825 using any combination of mobile devices 830*a* and surveying tools 830*b*, by camera 855*a* on aircraft 855, or by any combination of these image recording devices. Images of the owners of each plot 825 may also be taken and compiled with the images taken of each corresponding plot 825. According to some embodiments, a workflow management system may automatically determine that more images are required, and may automatically order more images from the field, by the cadastral surveyors at the plots 825 and/or by the aircraft 855, or the like. An exemplary workflow management system is described in U.S. patent application Ser. No. 13/790,114 filed on a date even herewith by Soubra et al. and titled "Workflow Management Method and System", which is incorporated by reference herein in its entirety.

Figure 9:
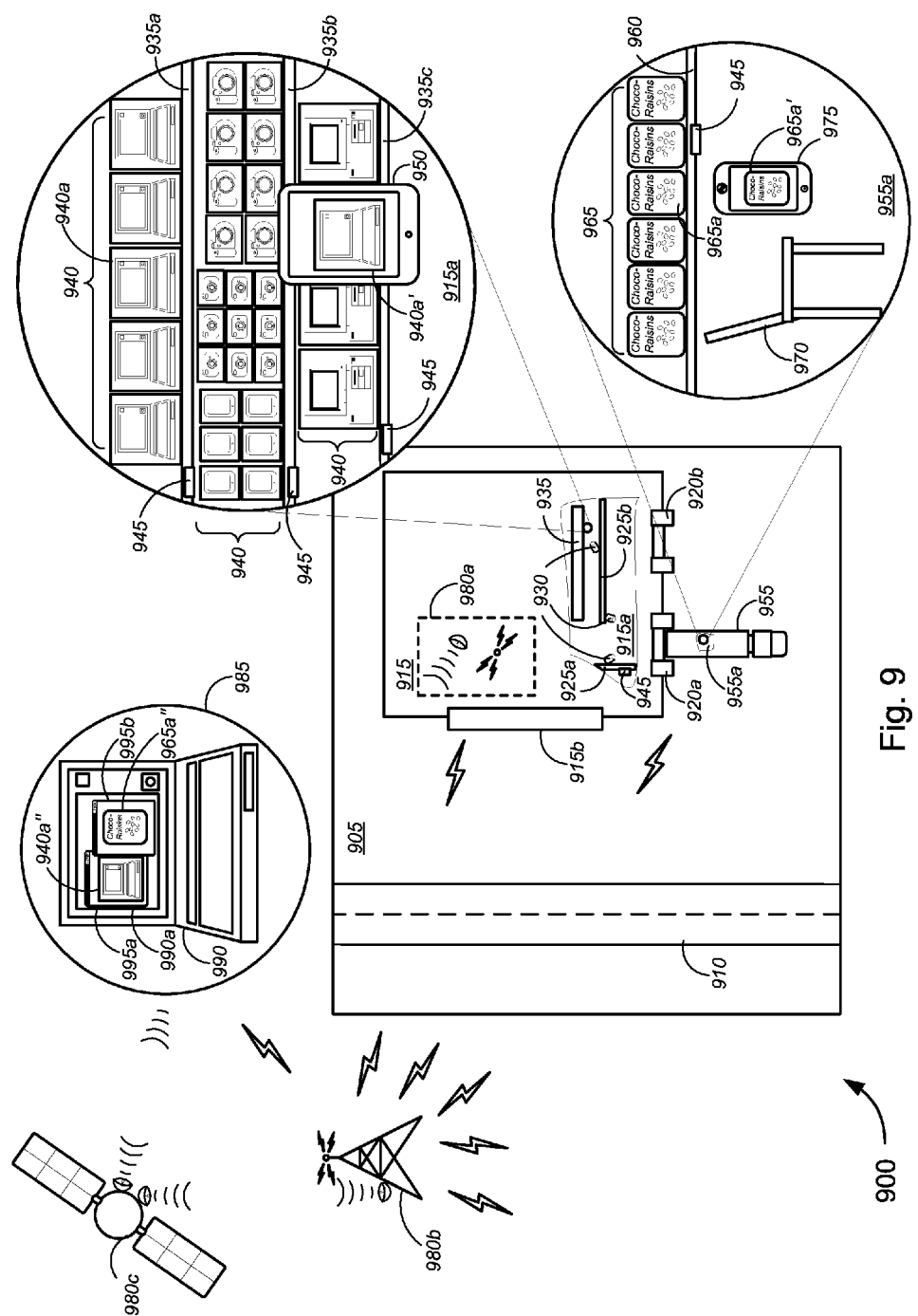
FIG. 9 is a schematic representation of an exemplary image identification system as used in an inventory or asset management system, in accordance with various embodiments.

FIG. 9 is a schematic representation of an exemplary image identification system 900 as used in an inventory or asset management system. The inventory or asset management system might utilize one or more wireless asset-tracking transceivers to send/receive data to/from wireless asset tracking devices. The one or more wireless asset-tracking transceivers might include, without limitation, RuBee tags and readers, radio frequency identification ("RFID") tags and readers, or any other types of wireless transceivers, or the like. An exemplary asset management system that utilizes wireless transceivers, which might be used in conjunction with the image identification method and system discussed herein, is described in U.S. patent application Ser. No. 12/760,139 filed on Apr. 14, 2010, by Harmon et al. and titled "ASSET MANAGEMENT SYSTEMS AND METHODS", which claims priority to provisional U.S. Patent Application No. 61/169,693, filed on Apr. 15, 2009 , now issued U.S. Pat. No. 8,344,879, all three of which are incorporated by reference herein in their entirety.

Turning to the example shown in FIG. 9, it may be desired to manage assets or inventory in a store or warehouse 915 or in a vehicle 955, both of which might be located in location or region 905. Location or region 905 might include one or more roadways 910 in proximity with store or warehouse 915. Store or warehouse 915 might include an interior 915*a*, a front entrance 915*b*, and one or more shipment docks 920, which might include a first dock 920*a* and a second dock 920*b*. Within the interior 915*a*, the store or warehouse 915 might comprise one or more walls 925, on which might be mounted one or more still or video cameras 930. The one or more walls 925 might include a first wall 925*a* and a second wall 925*b*. Between walls 925*a* and 925*b* might be an opening or door leading to the main portion of the store or warehouse 915, in which one or more shelving units 935 might be arranged.

According to some embodiments, a stock person or employee might stock inventory or assets on the shelving units 935, or might routinely update the inventory of the warehouse or store 915. For example, shelving unit 935 might include one or more shelves 935*a*-935*c* (collectively, "shelves 935"), on which might be placed a plurality of assets or inventory 940. In some embodiments, one or more first wireless transceivers 945—including, without limitation, RuBee tag readers, RFID tag readers, or the like—might be affixed to one or more shelves 935, on one or more walls 925, at entrance 915*b*, or at each dock 920, or on any combination of these locations. The assets or inventory 940 might include, but are not limited to, packages containing consumer items or unpackaged items. For example, the packaged consumer items might comprise, without limitation, laptop computers, desktop computers, tablet computers, smart phones, cellular phones, cameras, SLR cameras, household items, food products, and the like. The unpackaged items might include, but are not limited to, books, furniture, and the like. In some embodiments, each of the plurality of assets or inventory 940 might have one or more second wireless transceivers—including, but not limited to, a RuBee tag, an RFID tag, or the like—affixed on the asset or inventory, on packaging for the asset or inventory, or on an external wireless tag holder affixed to the packaging or to the unpackaged item. The one or more second wireless transceivers might interact with the one or more first wireless transceivers to track location information of each of the plurality of assets or inventory 940. In conjunction with the wireless asset management using the wireless transceivers, the stock person or employee might use an image capture device 950 to capture images of the assets or inventory, in a manner similar to that as described above with respect to FIGS. 1-8. The image capture device might include, but is not limited to, a tablet computer, a smart phone, a mobile phone, or the like. In the example of FIG. 9, a tablet computer 950 might be used to capture an image 940*a*' of asset 940*a*, which might include a package containing a laptop computer.

In some embodiments, it might be desired to track assets or inventory in a vehicle, such as in truck 955. In FIG. 9, an interior 955a of truck 955 might comprise one or more shelves 960, on which might be placed one or more assets or inventory 965 and 970. The one or more assets or inventory 965 and 970 might comprise packaged items 965 and unpackaged items 970, as discussed above with respect to items 940. Packaged items 965 might further include, without limitation bags of food items, while unpackaged items 970 might further include items of furniture (such as one or more chairs 970). According to some embodiments, one or more first wireless transceivers 945—including, without limitation, RuBee tag readers, RFID tag readers, or the like—might be affixed to one or more of the shelves 960, or on the interior 955a of the truck 955 (such as on a wall, ceiling, floor, or doors of the truck 955). Affixed on each of the assets or inventory 965 and 970, or on packages of the assets or inventory 965, might be one or more second wireless transceivers—including, but not limited to, a RuBee tag, an RFID tag, or the like. The one or more first wireless transceivers might interact with the one or more second wireless transceivers to keep track of the locations of each asset or inventory 965 and 970. According to some embodiments, a delivery person or an employee might use an image capture device 975 to capture an image of the asset or inventory 965 and 970 on the vehicle 955. The image capture device 975 might include, without limitation, a tablet computer, a smart phone, a mobile phone, or the like. In the example of FIG. 9, the delivery person might use a mobile phone 975 to capture an image 965a' of a package of chocolate-covered raisins.

The images of the package of the laptop computer 940a and the package of chocolate-covered raisins 965a might be sent to a remote computer (not shown) via communications relay system 980, including, but not limited to one or more building-mounted relays 980a, one or more towers 980b, one or more satellites 980c, or a combination of relays 980a, towers 980b, and satellites 980c. The remote computer might then process the images to identify one or more assets or inventory 940 and 965 captured in the images, in a similar manner as described in detail above with respect to various embodiments shown in FIGS. 1-5, 7, and 8. In some embodiments, the captured images may be stored for quality control purposes, so as to allow a user to later return to the analysis and trace any issue in the case that there might be a problem with the image identification process.

In addition to the various methods and processes described in the various embodiments above, the images may concurrently or at a later time be sent, via the one or more building-mounted relays 980a, one or more towers 980b, and/or one or more satellites 980c, not only to the personnel in the store or warehouse 915 or in the vehicles 955, but also to a regional/national office 985 located some distance away. In some cases, the regional/national office 985 might be affiliated with the owner or manager of the store or warehouse 915, the owner or manager of the vehicle 955, or a third party service provider. At the regional/national office 985, a worker might use a user computer 990, including a PC, a laptop computer, a mobile device, or the like. On one or more display windows 995 presented on display screen 990a of the user computer 990, the worker might view any combination of images and information related to the asset management process being conducted at store or warehouse 915, at vehicles 955, or both. For example, as shown on display screen 990a, two operational windows or GUIs 995 might be presented. In window 995a, an image 940a" of the package of laptop computer 940a taken at store or warehouse 915 may be displayed. Concurrently, an image 965a" of the package of chocolate-covered raisins 965a that was taken in vehicle 955 may be shown in window 995b.

From the regional/national office 985, the worker may order more images to be taken by the employees in the store or warehouse 915 or in the vehicles 955 using portable image recording devices 950 and 975. In some embodiments, the images may be captured using one or more cameras 930, which might be controlled by the worker in the regional/national office 985, or by an employee at the store or warehouse 915. Although not shown, similar cameras may be mounted within an interior 955a of truck 955. According to some embodiments, a workflow management system may automatically determine that more images are required, and may automatically order more images from the store or warehouse 915 or in the vehicles 955. An exemplary workflow management system is described in U.S. patent application Ser. No. 13/790,114 filed on a date even herewith by Soubra et al. and titled "Workflow Management Method and System", which is incorporated by reference herein in its entirety.

Other applications for image-identification-assisted asset management might include, without limitation, image identification and wireless tracking of assets and equipment in an office, hospital, airport, or the like. For example, in an office environment, the image identification and wireless tracking might be useful for keeping track of assets including, but not limited to computers, monitors, keyboards, mice, telephones, desks, shelves, printers, copiers, furniture, files or folders, and the like. In a hospital setting, additional equipment to keep track of might include hospital beds, IV drips, medications, syringes, test equipment, patient charts, or personnel such as doctors, nurses, nurse practitioners, orderlies, and the like. In an airport, the image identification and wireless tracking might be beneficial for keeping track of luggage, ground crews, flight crews, ground transports, refueling trucks, airplanes, tools, food items, food trucks, security instruments, sales inventory, and the like. For one or more of these items or personnel, temporary wireless tags might be affixed to the items or clothing of the personnel, respectively. Image identification might be used to verify identification of the items or of the personnel, while the wireless tracking tracks location of the items and personnel.

Although the various embodiments are generally or specifically directed to cadastral surveys and inventory or asset management, the various embodiments are not so limited. The process of identification of objects, structures, landmarks, or persons may be implemented in any setting and for any purpose. For example, airport or national port security measures may utilize the image identification processes described above to identify potentially dangerous items or objects, or potentially dangerous persons such as known or suspected terrorists, criminals, kidnappers, and the like. In other fields, the image identification may be used to develop more sophisticated or more detailed maps for global positioning systems ("GPSs"). In yet other embodiments, governmental or international agencies might utilize aerial images, satellite images, or a combination of images, coupled with the image identification processes described above, to identify natural and/or manmade occurrences or disasters in real-time. The natural and/or manmade occurrences or disasters might include, without limitation, conflicts, earthquakes, hurricanes, tornadoes, volcanic eruptions, tsunamis, or the like. At the same time, dangerous regions or areas, as well as safe ones, may be identified for coordination with ground crews or personnel. In other examples, search and rescue operations could benefit from image identification of missing persons, as well as of structures, landmarks, and objects associated with the last known sighting of the missing persons. These are but a few examples of the functionalities made possible by the image identification system and method as described above.

While certain features and aspects have been described with respect to exemplary embodiments, one skilled in the art will recognize that numerous modifications are possible. For example, the methods and processes described herein may be implemented using hardware components, software components, or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture or with respect to one system may be organized in alternative structural architectures or incorporated within other described systems. Hence, while various embodiments are described with—or without—certain features for ease of description and to illustrate exemplary aspects of those embodiments, the various components or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of associating a keyphrase with an image comprising:
   obtaining a first digital image of an object comprising a surveyed feature with a digital image recording device;
   storing the first digital image as an image file accessible with a local computer system;
   transmitting the image file to a remote image comparison software application running on a remote computer system;
   comparing the first digital image to multiple preexisting digital images with the image comparison software application;
   identifying a set of preexisting digital images matching the first digital image;
   determining a keyphrase associated with the preexisting digital images;
   returning the keyphrase to the local computer system;
   transferring the keyphrase returned to the local computer system to a cadastral survey program; and
   associating the keyphrase with a location on a cadastral survey which corresponds to the surveyed location of the surveyed feature.

2. The method of claim 1, further comprising:
   obtaining a second digital image of one or more objects with the digital image recording device;
   isolating the one or more objects in the second digital image with the remote image comparison software application;
   dividing the second digital image into one or more portions corresponding to the one or more objects with the remote image comparison software application;
   comparing each of the one or more portions of the second digital image to multiple preexisting digital images with the remote image comparison software application;
   identifying one or more sets of preexisting digital images matching corresponding one or more portions of the second digital image;
   determining one or more keyphrases associated with the preexisting digital images corresponding to each of the one or more objects; and
   returning the one or more keyphrases corresponding to each of the one or more objects to the local computer system.

3. The method of claim 2, further comprising:
   generating a point cloud for each of the one or more objects;
   fitting each point cloud with available 3D models; and
   determining an identity for each of the one or more objects based on the fit of each point cloud with the available 3D models.

4. The method of claim 3, further comprising:
   comparing the identity for each of the one or more objects with the one or more keyphrases;
   determining which of the one or more objects has a matching identity and keyphrase;
   returning one of the identity and the keyphrase for each of the one or more objects having a matching identity and keyphrase, based on said determination; and
   repeating at least one of the steps of determining one or more keyphrases or determining an identity for each of the one or more objects for which the identity and the keyphrase do not match, based on said determination.

5. The method of claim 1, wherein:
   storing the first digital image as an image file accessible with a local computer system comprises storing the first digital image as an image file in a recording medium in the local computer system; and
   transmitting the image file to a remote image comparison software application running on a remote computer system comprises transmitting the image file from the local computer system to the remote image comparison software application running on the remote computer system.

6. The method of claim 5, wherein one or more of the multiple image databases separate from the remote computer system comprise image databases which are generally accessible to the public without charge over the Internet.

7. The method of claim 1, wherein the steps of determining and returning a keyphrase associated with the preexisting digital images comprises:
   determining multiple possible keyphrases associated with multiple images in the set of preexisting digital images to generate a list of potential keyphrases;
   comparing the potential keyphrases included in the list of potential keyphrases to determine a best match keyphrase; and
   returning the best match keyphrase to the local computer system.

8. The method of claim 1, further comprising:
   obtaining user input confirming the keyphrase returned to the local computer system; and
   associating a confirmed keyphrase with the digital image.

9. The method of claim 1, further comprising:
obtaining user input rejecting the keyphrase returned to the local computer system; and
retransmitting the image file to the remote image comparison software application for reprocessing.

10. The method of claim 1, wherein the digital image is compared to preexisting digital images stored on multiple image databases separate from the remote computer system and accessed by the remote computer system over a network.

11. The method of claim 1, wherein comparing the digital image to multiple preexisting digital images with the image comparison software application comprises one or more of edge detection, histogram comparison, or point cloud analysis.

12. The method of claim 1, further comprising:
generating a point cloud for the object;
fitting the point cloud with available 3D models; and
determining an identity for the object, based on the fit of the point cloud with the available 3D models.

13. The method of claim 12, further comprising:
comparing the identity with the keyphrase;
returning one of the identity and the keyphrase, based on a determination that the identity and the keyphrase match; and
repeating at least one of the steps of determining the keyphrase or determining an identity for the object, based on a determination that the identity and the keyphrase do not match.

14. The method of claim 1, wherein the secondary software application is a software application selected from a group consisting of a land survey program, an architectural survey program, a geographical information system program, a cadastral survey program, an object recognition program, and a person identification program.

15. The method of claim 1, wherein the subject digital image is obtained with one or more of a digital camera, a video recorder, a webcam, a personal communications device having camera functionality, a surveying instrument, or a tablet computer.

16. The method of claim 1, wherein the keyphrase consists of one of a single word or a phrase containing two or more words.

17. The method of claim 1, further comprising tracking a location of the object using one or more wireless transceivers.

18. A system comprising:
a digital imaging device;
a local computer system in digital communication with the digital imaging device, the local computer system comprising a local processor and a local computer readable storage medium having encoded thereon instructions providing for the storage of an image file of a digital image of an object comprising a surveyed feature obtained by the digital imaging device;
a remote computer system in digital communication with the local computer system over a network, the remote computer system comprising a remote processor and a remote computer readable storage medium having instructions encoded thereon providing for:
receiving the digital image from the local computer system;
comparing the digital image to multiple preexisting digital images;
identifying a set of preexisting digital images matching the digital image;
determining a keyphrase associated with the preexisting digital images;
returning the keyphrase to the local computer system;
transferring the keyphrase returned to the local computer system to a cadastral survey program; and
associating the keyphrase with a location on a cadastral survey which corresponds to the surveyed location of the surveyed feature.

19. The system of claim 18, wherein the remote computer readable storage has instructions encoded thereon further providing for:
determining multiple possible keyphrases associated with multiple images in the set of preexisting digital images to generate a list of potential keyphrases;
comparing the potential keyphrases included in the list of potential keyphrases to determine a best match keyphrase; and
returning the best match keyphrase to the local computer system.

20. The system of claim 18, wherein the local computer readable storage has instructions encoded thereon further providing for:
obtaining user input confirming the keyphrase returned to the local computer system; and
associating a confirmed keyphrase with the digital image.

21. The system of claim 18, wherein the local computer readable storage has instructions encoded thereon further providing for:
obtaining user input rejecting the keyphrase returned to the local computer system; and
retransmitting the image file to the remote computer system for reprocessing.

22. The system of claim 18, wherein the remote computer readable storage medium has instructions encoded thereon further providing for comparing the digital image to preexisting digital images stored on multiple image databases separate from the remote computer system and accessed by the remote computer system over a network.

23. The system of claim 22, wherein one or more of the multiple image databases separate from the remote computer system comprise image databases which are generally accessible to the public without charge over the Internet.

24. The system of claim 18, wherein the remote computer readable storage medium has instructions encoded thereon further providing for comparing the digital image to multiple preexisting digital images by one or more of edge detection, histogram comparison, or point cloud analysis.

25. The system of claim 18, wherein the remote computer readable storage medium has instructions encoded thereon further providing for:
generating a point cloud for the object;
fitting the point cloud with available 3D models; and
determining an identity for the object, based on the fit of the point cloud with the available 3D models.

26. The system of claim 25, wherein the remote computer readable storage medium has instructions encoded thereon further providing for:
comparing the identity with the keyphrase;
returning one of the identity and the keyphrase, based on a determination that the identity and the keyphrase match; and
repeating at least one of determining the keyphrase or determining an identity for the object, based on a determination that the identity and the keyphrase do not match.

27. The system of claim 18, wherein the local computer readable storage has instructions encoded thereon further providing for transferring the keyphrase returned to the local computer system to a secondary software application.

28. The system of claim 27, wherein the secondary software application comprises a database of human identifications.

29. The system of claim 18, wherein the digital imaging device comprises one or more of a digital camera, a video recorder, a webcam, a personal communications device having camera functionality, a surveying instrument, or a tablet computer.

30. The system of claim 18, wherein the keyphrase consists of one of a single word or a phrase containing two or more words.

31. The system of claim 18, further comprising one or more first wireless transceivers that are wirelessly coupled to one or more second wireless transceivers affixed to the object.

* * * * *